US012759203B2

(12) United States Patent
Haley

(10) Patent No.: US 12,759,203 B2
(45) Date of Patent: Oct. 13, 2026

(54) FITNESS MACHINES, HANDLES FOR FITNESS MACHINES, AND METHODS FOR MAKING FITNESS MACHINES AND HANDLES

(71) Applicant: Life Fitness, LLC, Rosemont, IL (US)

(72) Inventor: Charles A. Haley, Rochester, MN (US)

(73) Assignee: Life Fitness, LLC, Rosemont, IL (US)

(*) Notice: Subject to any disclaimer, the term of this patent is extended or adjusted under 35 U.S.C. 154(b) by 400 days.

(21) Appl. No.: 18/450,923

(22) Filed: Aug. 16, 2023

(65) Prior Publication Data

US 2024/0058998 A1 Feb. 22, 2024

Related U.S. Application Data

(60) Provisional application No. 63/399,093, filed on Aug. 18, 2022.

(51) Int. Cl.

| | |
|---|---|
| ***B29C 45/16*** | (2006.01) |
| ***A63B 22/02*** | (2006.01) |
| ***B29C 45/00*** | (2006.01) |
| ***B29C 45/17*** | (2006.01) |
| ***B29L 31/52*** | (2006.01) |

(52) U.S. Cl.

CPC .......... *B29C 45/1634* (2013.01); *A63B 22/02* (2013.01); *B29C 45/1775* (2013.01); *A63B 2230/04* (2013.01); *B29C 2045/0089* (2013.01); *B29K 2995/0005* (2013.01); *B29K 2995/0097* (2013.01); *B29L 2031/52* (2013.01)

(58) Field of Classification Search

CPC ..... A63B 22/00; A63B 2230/04; B29C 45/16; B29C 2045/169

USPC .......................................................... 264/255

See application file for complete search history.

(56) References Cited

U.S. PATENT DOCUMENTS 4,334,676 A 6/1982 Schonenberger
4,614,337 A 9/1986 Schonenberger (Continued)

FOREIGN PATENT DOCUMENTS

CN 108578984 A 9/2018
CN 213260942 U 5/2021

OTHER PUBLICATIONS

International Search Report & Written Opinion in corresponding International Patent Application No. PCT/US2023/072401 dated Nov. 7, 2023.

*Primary Examiner* — Jason L Vaughan
(74) *Attorney, Agent, or Firm* — Andrus Intellectual Property Law, LLP

(57) ABSTRACT

A method of making a fitness machine. The method includes providing a base device with which an operator may exercise and providing handles each having a non-conductive portion and a conductive portion, the conductive portion being electroplated. The method further includes coupling the handles to the base device so as to be gripped by the operator while exercising and electrically coupling the conductive portion of each of the handles to a control system configured to determine cardiac information for the operator, where the conductive portion of each of the handles receives electrical activity from the operator when gripped, and where the conductive portion is electrically coupled such that the electrical activity is provided to the control system for determining the cardiac information for the operator based thereon.

11 Claims, 14 Drawing Sheets

(56) References Cited

U.S. PATENT DOCUMENTS

| | | | | |
|---|---|---|---|---|
| 4,635,927 | A | 1/1987 | Shu | |
| 4,635,928 | A | 1/1987 | Ogden et al. | |
| 4,643,418 | A | 2/1987 | Bart | |
| 4,659,074 | A | 4/1987 | Taitel et al. | |
| 4,664,371 | A | 5/1987 | Viander | |
| 4,749,181 | A | 6/1988 | Pittaway et al. | |
| 5,365,934 | A | 11/1994 | Leon et al. | |
| 5,372,501 | A * | 12/1994 | Shalvi | A61N 1/322 604/20 |
| 5,409,435 | A * | 4/1995 | Daniels | F16D 57/002 482/901 |
| 6,095,951 | A | 8/2000 | Skowronski et al. | |
| 6,165,129 | A * | 12/2000 | Bates | A61B 5/222 600/382 |
| 6,203,474 | B1 | 3/2001 | Jones | |
| 6,533,709 | B1 | 3/2003 | Jones | |
| 6,572,512 | B2 | 6/2003 | Anderson et al. | |
| 6,783,482 | B2 | 8/2004 | Oglesby et al. | |
| 7,052,439 | B2 | 5/2006 | Anderson et al. | |
| 7,101,316 | B2 | 9/2006 | Rosenow et al. | |
| 7,435,202 | B2 | 10/2008 | Daly et al. | |
| 7,674,206 | B2 * | 3/2010 | Jones | A61H 1/0255 482/54 |
| 8,021,274 | B2 | 9/2011 | Anderson et al. | |
| 8,025,607 | B2 * | 9/2011 | Ranky | A63B 22/0605 482/8 |
| 8,080,995 | B2 * | 12/2011 | Yan | H01Q 1/243 324/300 |
| 8,652,051 | B2 * | 2/2014 | Twery | A61B 5/024 600/481 |
| 8,926,432 | B2 * | 1/2015 | Roberts | A63F 13/212 463/36 |
| 9,216,317 | B2 | 12/2015 | Golen et al. | |
| 11,557,709 | B2 | 1/2023 | Martinis | |
| 11,802,347 | B2 * | 10/2023 | LaVallee | B29C 45/14811 |
| 2004/0171464 | A1 * | 9/2004 | Ashby | A63B 22/00 482/8 |
| 2007/0135698 | A1 | 6/2007 | Shah et al. | |
| 2007/0244400 | A1 | 10/2007 | Honda | |
| 2009/0233710 | A1 * | 9/2009 | Roberts | A63F 13/285 463/36 |
| 2016/0073914 | A1 | 3/2016 | Lapetina et al. | |
| 2017/0027468 | A1 | 2/2017 | Huang et al. | |
| 2017/0274242 | A1 | 9/2017 | Corbalis | |

* cited by examiner

FITNESS MACHINES, HANDLES FOR FITNESS MACHINES, AND METHODS FOR MAKING FITNESS MACHINES AND HANDLES

CROSS REFERENCE TO RELATED APPLICATION

This application claims the benefit of U.S. Provisional Patent Application No. 63/399,093, filed Aug. 18, 2022, which is incorporated herein by reference in its entirety.

FIELD

The present disclosure generally relates to fitness machines, handles for fitness machines, and methods for making fitness machines and handles.

BACKGROUND

The following are incorporated herein by reference in entirety.

U.S. Pat. No. 5,365,934 discloses an exercise apparatus for measuring heart rate having a sensor for generating a signal which includes the biopotential signal produced by a heart. This signal is filtered, amplified and digitized. A computer auto-correlates the digitized signal. A plurality of signal indication routines then scan the autocorrelated output for the presence of periodic signals. Each of the signal indication routines uses different search or filter criteria, such as peak and wave form detection, and generates one (and in some cases, several) candidate heart rates. Certain embodiments are especially well-suited for measuring the heart rate of a user while exercising on a stair climbing machine or treadmill.

U.S. Pat. No. 6,783,482 discloses a microprocessor-based exercise treadmill control system which includes various features to enhance user operation.

Examples of treadmills are illustrated in U.S. Pat. Nos. 4,635,928; 4,659,074; 4,664,371; 4,334,676; 4,635,927; 4,643,418; 4,749,181; 4,614,337; 6,095,951; and 6,572,512, as well as U.S. Patent App. Pub. No. 2021/0283465. Examples of elliptical trainers are illustrated in U.S. Pat. Nos. 7,101,316; 7,435,202; and 8,021,274. Examples of other exercise equipment are illustrated in U.S. Pat. Nos. 6,203,474; 6,533,709; 7,052,439; 7,267,635; and 9,216,317.

SUMMARY

This Summary is provided to introduce a selection of concepts that are further described below in the Detailed Description. This Summary is not intended to identify key or essential features of the claimed subject matter, nor is it intended to be used as an aid in limiting the scope of the potentially subject matter.

One aspect of the present disclosure generally relates to a method of making a fitness machine. The method includes providing a base device with which an operator may exercise and providing handles each having a non-conductive portion and a conductive portion, the conductive portion being electroplated. The method further includes coupling the handles to the base device so as to be gripped by the operator while exercising and electrically coupling the conductive portion of each of the handles to a control system configured to determine cardiac information for the operator, where the conductive portion of each of the handles receives electrical activity from the operator when gripped, and where the conductive portion is electrically coupled such that the electrical activity is provided to the control system for determining the cardiac information for the operator based thereon.

In certain examples, the method further includes forming each of the handles via two-shot injection molding, where a first shot in the two-shot injection molding comprises a first material that forms the non-conductive portion, and where a second shot in the two-shot injection molding comprises a second material that defines a shape of the conductive portion, whereby the conductive portion is electroplated upon the second material. In further examples, the first material is incompatible with an electroplating process and the second material is compatible with the electroplating process, the method further including performing the electroplating process on each handle to form the conductive portion upon the second material thereof.

In certain examples, the conductive portion includes a first conductive portion and a second conductive portion formed in two non-contiguous areas, where each of the handles has a first part and a second part each having the non-conductive portion, the first conductive portion, and the second conductive portion, where a first area of the two non-contiguous areas is formed on the first part and a second area of the two non-contiguous areas is formed on the second part, and the method further includes, for each of the handles, coupling the first part and the second part together such that the non-conductive portions electrically insulate the first conductive portion and the second conductive portion from each other. In a further examples, the method further includes forming the non-conductive portions of the first part and the second part of each handle via two-shot injection molding, where a first shot and a second shot in the two-shot injection molding comprise a first material and a second material that are different than each other, where the non-conductive portions of each handle have exterior sides facing outwardly and interior sides facing inwardly when the first part and the second part are coupled together, and where for the first part and the second part of each handle the exterior side of the first material is entirely covered by the second material.

In certain examples, the conductive portion includes a first conductive portion and a second conductive portion formed in two non-contiguous areas, where for each of the handles each of the two non-contiguous areas extends between an exterior side configured to be contacted by the operator in use and an interior side positioned inside one of the handles, the method further including, for each of the handles, electrically coupling the control system via conductors to the interior sides of the two non-contiguous areas such that the conductors are protected within the handles. In further examples, the conductors include connectors for connecting wires, the method further including electrically coupling the control system to the two non-contiguous areas by drawing the connectors into contact with the interior sides of the two non-contiguous areas via fasteners.

In certain examples, the method further includes forming each of the handles of a first material via injection molding, where the first material is compatible with an electroplating process, the method further including masking the first material such that a masked portion of the first material is covered for each of the handles, and performing the electroplating process on each of the handles to form the conductive portion upon a remaining portion of the first material that is unmasked, where the masked portion forms the non-conductive portion of the handle.

In certain examples, the method further includes coupling the handles so as to be at least partially recessed within the base device. In further examples, each of the handles comprises an exterior surface configured to be contacted by the operator in use, the method further including coupling each of the handles to the base device such that the exterior surface is flush with the base device.

In certain examples, the method further includes, for each of the handles, forming the conductive portion to be less than 0.10 mm thick.

Another aspect of the present disclosure generally relates to a handle for a fitness machine produced via an electroplating process. The handle includes a part having a first material that is compatible with the electroplating process. A masked portion of the part is substantially free of electroplating from the electroplating process. An electroplated portion formed via the electroplating process is present in a remaining portion of the part such that the first material is covered by electroplating in the electroplated portion. The masked portion forms a non-conductive portion of the handle and the electroplated portion forms a conductive portion of the handle, the conductive portion being configured to conduct electrical activity from an operator of the fitness machine contacting the conductive portion of the handle during use of the fitness machine.

Another aspect of the present disclosure generally relates to a fitness machine configured to determine cardiac information for an operator. The fitness machine includes a base device with which an operator may exercise. Handles are each coupled to the base device and configured to be gripped by the operator while exercising, where each of the handles includes a non-conductive portion and a conductive portion, and where for each of the handles the conductive portion is electroplated. A control system is electrically coupled to the conductive portion of each of the handles such that the control system receives electrical activity from the operator therethrough, where the control system is configured to determine the cardiac information for the operator based on the electrical activity received via the handles.

In certain examples, for each of the handles the non-conductive portion includes a first material and a second material that are different from each other, the second material overlays the first material, and the second material defines a shape of the conductive portion, the conductive portion being formed thereupon.

In certain examples, each of the handles includes a first material compatible with an electroplating process, where the first material has a surface comprising a masked portion and a remaining portion different than the masked portion, the remaining portion being covered in electroplating and the masked portion being substantially free of electroplating, the masked portion forming the non-conductive portion of the handle.

In certain examples, the conductive portion includes a first conductive portion and a second conductive portion formed in two non-contiguous areas, where each of the handles has a first part and a second part each having the non-conductive portion, the first conductive portion, and the second conductive portion, where a first area of the two non-contiguous areas is formed on the first part and a second area of the two non-contiguous areas is formed on the second part, and where when the first part and the second part are coupled together to form one of the handles the non-conductive portions electrically insulate the first conductive portion and the second conductive portion from each other.

In certain examples, for each of the handles the conductive portion extends between an exterior side configured to be contacted by the operator in use and an interior side positioned inside one of the handles, and wherein for each of the handles the control system is electrically coupled via conductors to the interior side of the conductive portion such that the conductors are protected within the handle. In further examples, the conductors include wires that electrically couple the control system to the conductive portion of each of the handles, respectively, via a connector coupled to the conductive portion in compression via a fastener.

In certain examples, the base device includes two arms and the handles are coupled such that the conductive portions thereof directly contact the two arms, respectively.

In certain examples, for each of the handles the conductive portion is less than 0.10 mm thick.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following drawing.

DETAILED DISCLOSURE

Figure 1:
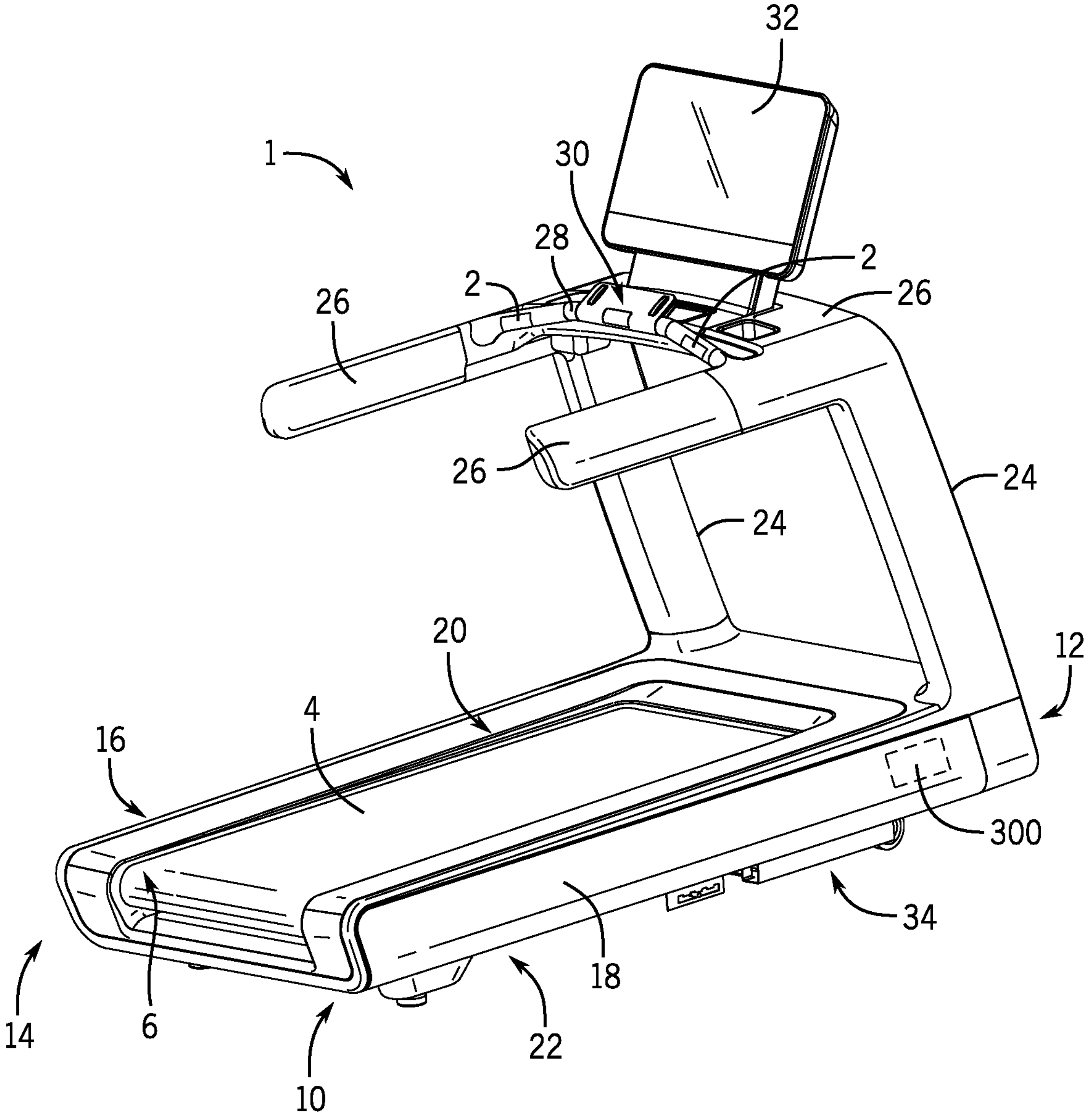
FIG. 1 is a rear perspective view of a fitness machine according to the present disclosure.

The present disclosure generally relates to fitness machines and handles for fitness machines, as well as methods for making each. FIG. 1 depicts a fitness machine 1 incorporating handles 2 according to the present disclosure. The fitness machine 1 shown is particularly a treadmill having a belt 4 that continuously cycles about belt rollers 6 such that a user (or operator) may run or walk on the belt 4 in a conventional manner. While the present disclosure principally focuses on treadmills as the fitness machine 1, the teachings also apply to other types of exercise equipment known in the art. By way of non-limiting example, these may include upright bicycles, recumbent bicycles, cross-training or elliptical trainers, rowing machines, and stair climbers.

The fitness machine 1 of FIG. 1 is supported by a base 10 and extends between a front 12 and a rear 14, a left 16 and a right 18, and a top 20 and a bottom 22. Vertical members 24 extend upwardly from the base 10 to support horizontal members 26 displaced above the base 10. The horizontal members 26 may be used by the operator for support and balance, particularly while getting on and off the fitness machine 1. A pair of arms 28 extend from the horizontal members 26 and provide a structure for mounting the handles 2. The arms 28 position the handles 2 in a comfortable location for the operator to grip while exercising. In certain embodiments, the arms 28 comprise a non-conductive material so as to not form an electrical connection with the handles coupled thereto.

As discussed further below, the fitness machine 1 includes a control system 300 that is configured to determine cardiac information for the operator while the handles 2 are being gripped (e.g., to measure the operator's heart rate in real-time). In particular, two electrodes are provided within the handle 2 for each hand, one a sensing electrode and the other a ground electrode. The two electrodes are electrically isolated from each other, preventing shorting via direct contact with each other and/or through the fitness machine 1 (e.g., through the arm 28). The control system 300 then measures the electrical activity from the electrodes of the handles 2 to determine cardiac information by comparing the signals from the two electrodes from each of the two hands. Methods are known in the art for determining cardiac activity using two or more electrodes. Additional information for one example of determining cardiac information is provided in U.S. Pat. No. 5,365,934. In short, when a heart muscle contracts, the body generates a very low amplitude electric signal known as a biopotential signal. It is well known that this biopotential signal can be electronically detected on the surface of a person's skin via an electrode (which senses this electrical activity). Since the heart expands and contracts in a regular rhythm, it generates a periodic biopotential signal on the skin that correspond to a person's heartbeat.

Generally, voltage fluctuations on a person's skin can be sensed by measuring the voltage potential between two or more electrodes provided in contact with the skin at two different locations of the body. The signal is then amplified and filtered to remove biopotential signals unrelated to heart rate. The frequency of the residual signal is then determined and displayed as heart rate (e.g., in beats per minute).

While the present disclosure primarily discusses configurations in which each hand has two electrodes, which provides increased accuracy and reduced signal noise, the teachings also apply to configurations in which one or both hands are provided with a single electrode.

It should be recognized that the present disclosure contemplates fitness machines 1 in which the handles 2 are positioned other than that shown in FIG. 1. These positions may vary by the setup and type of the fitness machine, such as the handles 2 being positioned at waist level for a recumbent bicycle and in front of the user for an upright bicycle, as is conventional. Moreover, while the fitness machine 1 of FIG. 1 shows only one pair of handles 2 and corresponding arms 28, the present disclosure contemplates fitness machines 1 in which a different number of handles 2 are provided. Likewise, the handles may be moving or stationary.

Controls 30 are also supported by the horizontal members 26, which may include scroll wheels, buttons, and resistive and/or conductive sensors. A console 32 is also supported by the horizontal members 26, which along with the controls 30 allow the operator to control different functions of the fitness machine 1 in a conventional manner. These functions may include controlling the speed and/or incline of the belt 4 relative to a horizontal plane (e.g., via a height adjustment system 34 in a manner known in the art), resistance levels (e.g., for example with bicycles, rowers, elliptical trainers, and/or treadmills in which the user rotates the belt), and/or other conventional functions known in the art.

Figure 2:
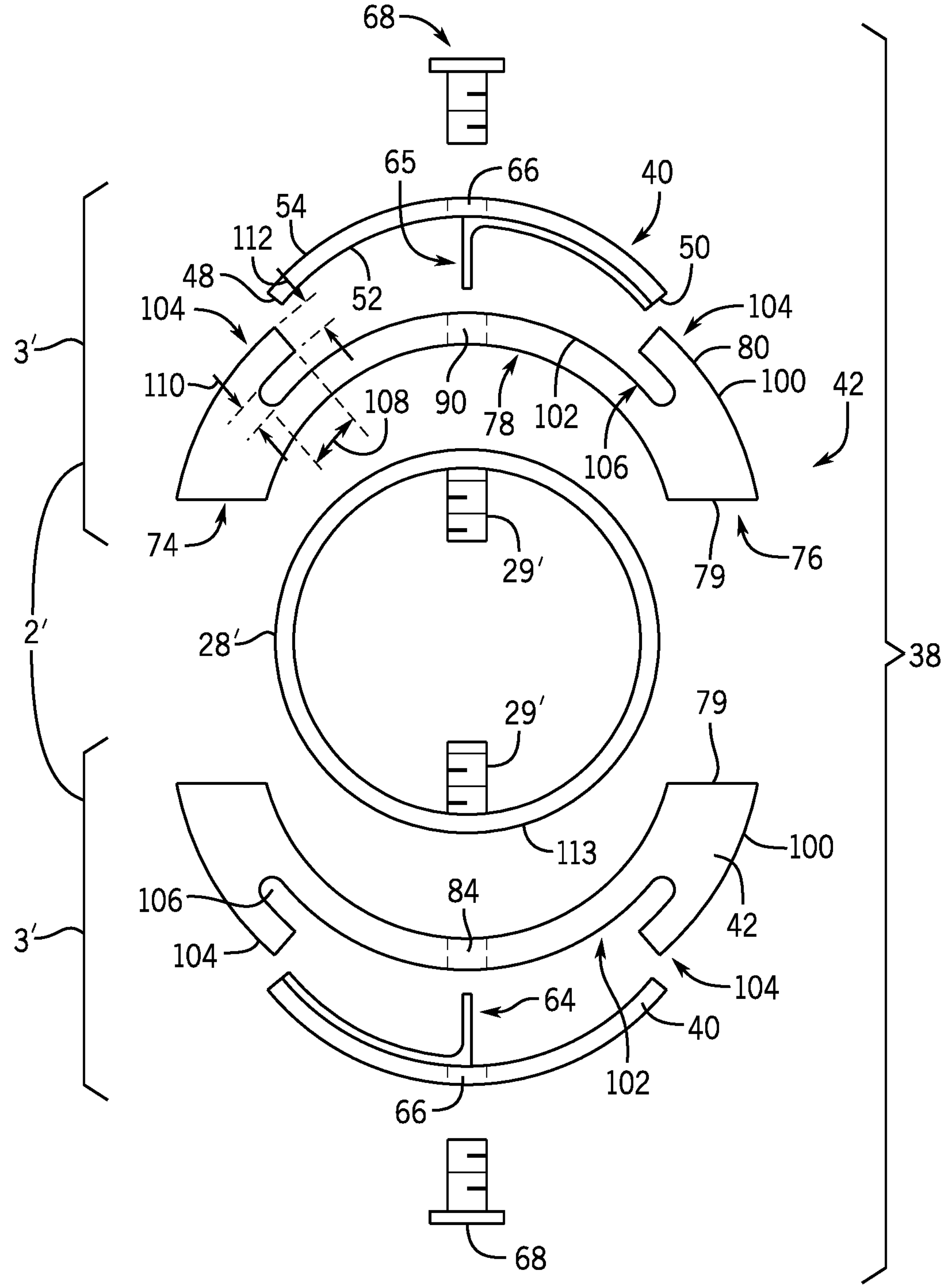
FIG. 2 is an exploded sectional view of a handle for a fitness machine.

FIG. 2 shows an example of a handle assembly 38 similar to those presently known in the art. The handle assembly 38 includes a handle 2' that is configured to be mounted to an arm 28' (which may be supported by the horizontal members 26 and the base 10 of a fitness machine 1 as shown in FIG. 1). The handle 2' is shown having two parts 3', 3" that each include a conductive plate 40 (also referred to as an electrode) partially surrounded by a body 42 that is non-conductive. The body 42 may be a plastic resin that is over-molded over the conductive plate 40 using conventional methods. The conductive plate 40 may be stamped stainless-steel. For simplicity, additional detail will be provided for a single part 3', which may be replicated for the other part 3".

Figure 3:
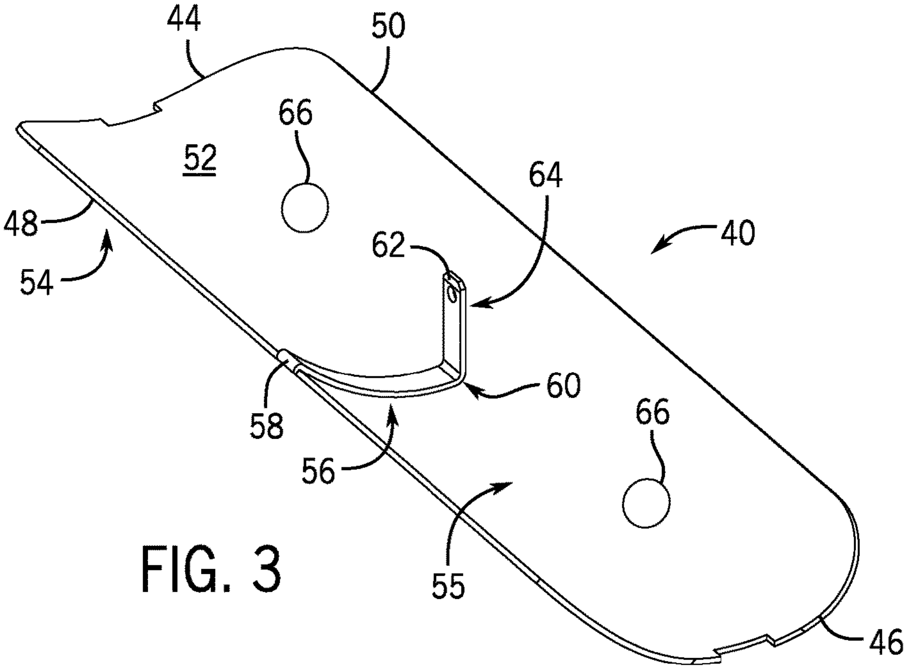
FIG. 3 is a perspective view of the conductive plate shown in FIG. 2.

With reference to FIGS. 2 and 3, each conductive plate 40 extends along a length between a first end 44 and a second end 46 and along a width between a third end 48 and a fourth end 50 with an interior side 52 and an exterior side 54 each extending therebetween. A thickness is defined between the interior side 52 and the exterior side 54. An elongated tab 56 extends away from a main body 55 of the conductive plate 40 at approximately a midpoint between the first end 44 and the second end 46. The elongated tab 56 has a first bend 58 of approximately 180 degrees where it extends from the main body 55 such that the elongated tab 56 is folded back against the interior side 52. At approximately a midpoint between the third end 48 and the fourth end 50 of the conductive portion, the elongated tab 56 has a second bend 60 of approximately 90 degrees. The second bend 60 provides that a free end 62 of the elongated tab 56 extends approximately perpendicularly away from the interior side 52 of the conductive plate 40, which serves as a spade-type connector 64 for connecting conductors to the conductive plate 40. In certain cases, the connector 64 is welded onto the interior side 52 of the conductive plate 40 rather than being formed by bending. The conductive plate 40 may have a thickness of approximately 0.5 mm Openings 66 are provided through the conductive plate 40 such that a fastener 68 can be extended therethrough to couple the conductive plate 40 to the arm 28' (e.g., via a threaded opening 29' in the arm 28'). By way of example, the fastener 68 may be a threaded fastener such as a screw or bolt, a press-fit fastener, or a rivet. In other embodiments, rather than each part having its own fastener that threadingly engages with its own threaded opening in the arm, one or more fasteners extend through one part, though the arm, and then threadedly engage with the opposing part on the other side of the arm.

Figure 4:
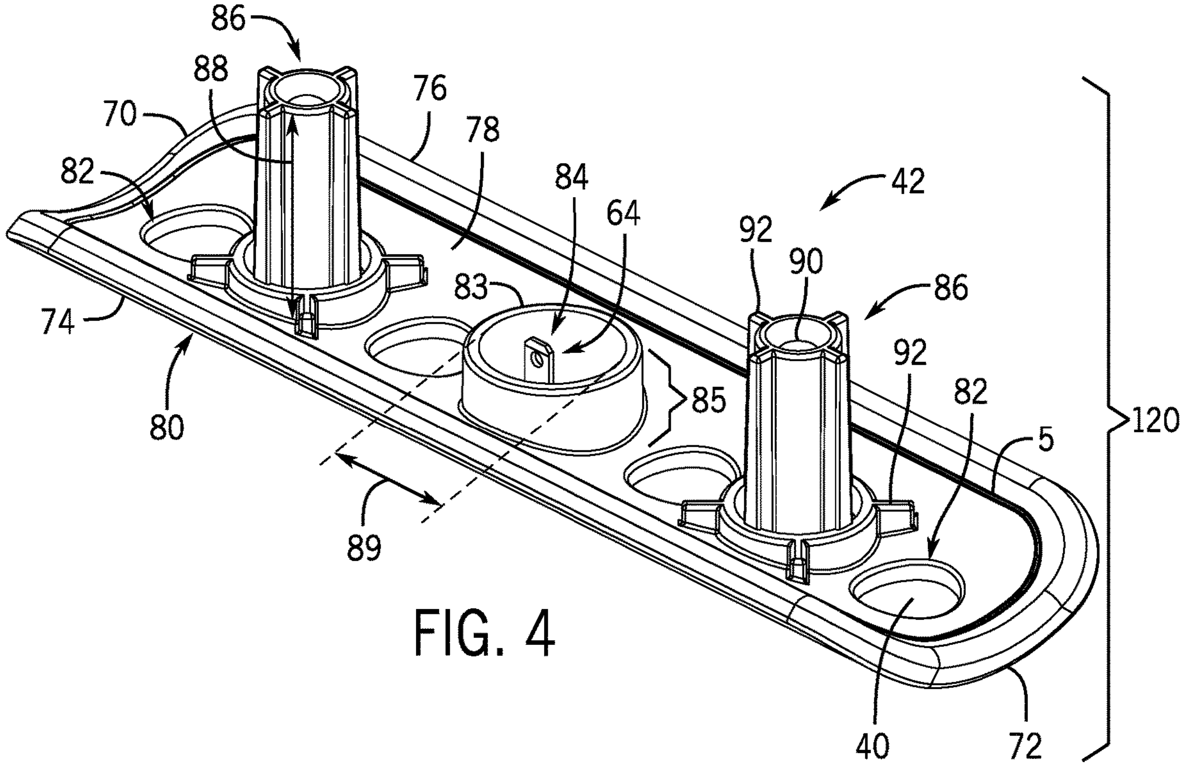
FIG. 4 is a perspective view of the conductive plate of FIG. 3 over-molded with a non-conductive body.

The conductive plate 40 is over-molded via conventional processes to form the body 42 partially surrounding the conductive plate 40. With reference to FIGS. 2 and 4, each body 42 extends along a length between a first end 70 and a second end 72 and along a width between a third end 74 and a fourth end 76 with an interior side 78 and an exterior side 80 each extending therebetween. A thickness is defined between the interior side 78 and the exterior side 80. Segments 79 extend between the interior sides 78 and the exterior side 80. As with the interior side 52 of the conductive plate 40, the interior side 78 of the body 42 is contoured so as to generally correspond to the shape of the arm 28' to which the handle will be coupled (e.g., an outer diameter 113 of the arm 28'). The segments 79 of the bodies 42 are configured to abut one another when the bodies 42 are coupled to the arms 28'.

A collar 83 with an opening 84 is also provided, which is configured to align with the connector 64 of the conductive plate 40 such that the connector 64 remains accessible from the interior side 78 of the part 3' after over-molding. The collar 83 extends upwardly from the interior side 78 by a height 85 and has the opening 84 therein with a diameter 89 sufficient to make connections to the connector 64 extending through the opening 84. The collar 83 also prevents accidental shorting between the connector 64 and the arm 28' or other support structures.

With continued reference to FIG. 4, bosses or standoffs 86 also extend upwardly from the interior side 78 of the body 42, here having a height 88 and an opening 90 therein. Note that the standoffs 86 and corresponding openings in the arm 28' are in certain places omitted in FIG. 2 for clarity. Ribs 92 provide stability to the standoff 86. The fasteners 68 (FIG. 2) extend through the openings 90 of the standoffs 86 to couple the parts 3', 3" to the arm 28'. For embodiments in which the handles 2' include standoffs 86, such as the body 42 shown in FIG. 4, the arm 28' would be designed to accommodate this height 88 (e.g., having corresponding openings in the arm 28'). The standoffs 86 provide proper alignment, as well as lateral strength, for the connection between the handle 2' and the arm 28' or other supportive elements such as non-conductive shells, discussed further below. The standoffs 86 of one part 3' have a greater height 88 than the standoffs 86 of a corresponding part 3". The part 3' may be installed first, allowing for cables to be routed around the standoffs 86 before the part 3" is installed, reducing the risk of pinching or severing wires when the fasteners 68 are extended through the parts 3', 3". The fasteners 68 are self-tapping screws that extend entire through the openings 90 in the standoffs 86 of one part 3' (e.g., those with the shorter height 88) and partially into the openings 90 in the standoffs 86 of the opposing part 3" (e.g., those with the taller height 88).

FIG. 2 shows each conductive plate 40 separated from the corresponding body 42 to show further details regarding the overall construction of the handle assembly 38 from the over-molding process. The exterior side 80 of the body 42 is further defined as having a first surface 100 and a second surface 102 that is recessed from the first surface 100. Flaps 104 of the first surface 100 extend in a cantilevered manner over the second surface 102 such that cavities 106 are formed between the flaps 104 and the second surface 102. Each cavity 106 extends the length of the conductive plate 40 (i.e., between the first end 44 and the second end 46 as shown in FIG. 3) and has a width 108 and a depth 110. The depth 110 corresponds to the thickness of the conductive plate 40 between the interior side 52 and the exterior side 54 thereof. The flaps 104 have a thickness 112 of approximately 1.0 mm, which again must be sufficiently thick so as to securely retain the conductive plate 40 within the body 42. Therefore, the exterior side 54 of the conductive plate 40 is necessarily recessed by at least 1.0 mm from the exterior side 80 of the body 42. It should be recognized that similar cavities also exist within the body 42 to accommodate the first end 44 and the second end 46 of the conductive plate 40 after the over-molding process. In this manner, the exposed portion of the conductive plate 40 is necessarily less than its entire surface area. In particular, it should be recognized that the cavities 160 must be sufficiently sizes so as to securely capture the conductive plate 40 therein.

The present inventor has recognized problems with the design of the handle 2' shown in FIGS. 2-4. First, the process of making the conductive and non-conductive portions of the handle necessarily requires at least four parts for each handle 2' (excluding fasteners): two conductive plates 40, two bodies 42, which are then coupled to a separate arm 28'. In a conventional design known in the art, whereby additional non-conductive shells are positioned between the bodies 42, this part count doubles to eight. Moreover, it is important to note that while the handle 2' of FIG. 2 is shown having parts 3', 3" that may be identical to each other, this is often not the case. In other words, if a handle 2' has a more complicated shape and/or is otherwise not formed by symmetrical parts (e.g., left-hand versus right-hand handles, top versus bottom parts, etc.), the number of unique individual parts further expands. For cost and inventory purposes, it would be advantageous to reduce this part list, which also reduces the tooling to produce handles.

Additionally, the present inventor has recognized that the designs of handles presently known in the art are susceptible to damage. In particular, and with reference to FIG. 4, the conductive plate 40 must be thick enough that the first bend 58 and second bend 60 do not result in the elongated tab 56 breaking off of the main body 55. Moreover, the connector 64 is essentially a long lever arm connecting back to the main body 55, risking damage when wires are subsequently connected or removed from the connector 64. Similarly, through experimentation and development the present inventor has recognized that the press-fit or interference connections presently used for handles know in the art is undesirable in that the connections are prone to failure over time, as well as accidental disconnection.

The present inventor has further identified that it is often uncomfortable or otherwise undesirable for the exterior side 54 of the conductor plate 40 to be below the exterior side 80 of the body 42 surrounding it, which as stated above is at least 1.0 mm lower. Likewise, the exposed surface area of the conductive plate 40 is necessarily less than its overall surface area. In other words, there must be a border of the body 42 on each side of the conductive plate 40.

The present inventor has identified a further problem with making handles 2' using the methods presently known in the art. In particular, when a high temperature liquid resin is molded over an unheated steel electrode, there is a different rate of shrink as these different materials cool. The thermal shrink rate for ABS plastic is approximately 5.5 times greater than for steel (e.g., ABS being 72-108 10^-6 m/(m*deg C.) versus 316 SST being 16.0 10^-6 m/(m*deg C.)). This causes the ABS plastic to shrink around the steel, creating residual stress in the components. This makes the components of the handle more prone to damage, warping, and stress cracking.

Additionally, the steel electrode shape is limited by how steel can be formed and there are limited options for the texture, finish, and color of stainless steel.

Figure 5:
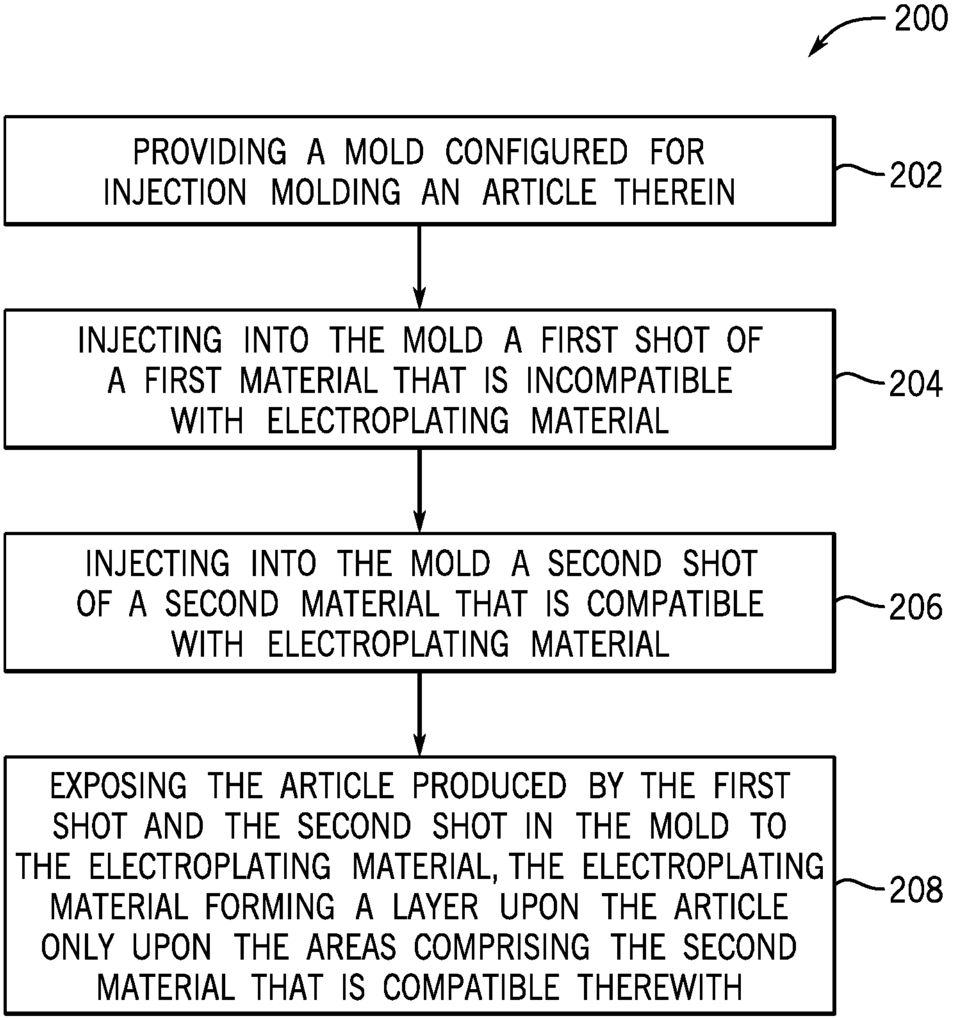
FIG. 5 is a flow chart of a method for making a handle according to the present disclosure.

FIG. 5 shows an exemplary method 200 for producing parts for handles according to the present disclosure. Step 202 recites providing a mold that is configured for injection molding an article therein, for example as dual-shot injection molding in a conventional manner. In step 204, a first shot is injected into the mold. The first shot is particularly a first material that is incompatible with electroplating processes. For clarity, a surface being incompatible with the electroplating processes described herein and/or generally known means that after performing the electroplating process on the part, that surface remains substantially free of electroplating, whereas other surfaces of the same part that are compatible with the electroplating process will have become electroplated. By way of example, the first material may be a plastic resin such as a polycarbonate (e.g., an unblended polycarbonate), unblended polyester, unblended nylon, unblended Valox or others known in the art. Step 206 provides for injecting a second shot into the mold, specifically with a second material that is compatible with the electroplating process (e.g., another type of plastic resin different than the first material). The second shot is injected so as to form an area supported by (or in certain configurations, formed upon) the first shot. By way of example, the second material may be acrylonitrile-butadiene-styrene (ABS) plastic, Bayblend (a combination of polycarbonate and ABS), polycarbonate, or polypropylene blends.

In certain examples, the mold is designed such that a u-shaped groove is formed at the intersections between the first material and the second material. This groove prevents a buildup of materials following the electroplating process discussed below, which could have an unpolished, discernable feeling and/or sharp edge for the user.

It should be recognized that the mold in which the first shot and the second shot are injected may constitute two separate components and/or a component having separate regions for injecting the first and second shots. For example, the first shot may be injected into a first component of the mold, whereby when the first material is cooled it is transferred to a second component of the mold via rotating platen or a robotic arm. The second shot is then injected in, through, around, and/or over the first material depending upon the design. The first material and the second material form a molecular and/or mechanical bond and cooled to form a combined article, which is subsequently ejected from the mold.

With continued reference to the method 200 of FIG. 5, the article produced by the first shot and the second shot then undergoes the electroplating process in step 208 using conventional methods (also referred to as galvanic treatments). In certain techniques, the article is dipped in the electroplating materials, which may be a water-based solution of electrolytes containing metals to be deposited as ions (i.e., dissolved metal salts). An electric field is formed between an anode within the solution and the article as the cathode, which forces positively charged metal ions to move to the cathode (the article). The positively charged metal ions give up their charges and deposit themselves as metal upon the electroplating processing compatible surfaces of the article. The electroplating processing therefore forms a layer of conductive material upon the article only in the areas of the second material, as the first material is specifically chosen to be incompatible with the electroplating process. In certain examples, the layer formed via the electroplating process (also referred to as the electroplating, which may itself comprise many sublayers) is less than 0.10 mm thick.

The electroplating materials and the electroplating process may itself comprise multiple steps and/or materials. In one example, a base layer is first formed on the second material, which may be copper and may be formed to have a thickness between 15 and 25 microns (0.015 to 0.025 mm). An under-layer is then formed upon the base layer, which may be nickel, to have a thickness between 3 and 7 microns (0.003 to 0.007 mm). The under-layer may be specifically chosen to provide different appearances, such as satin, bright, or other desirable finishes. An additional layer is then applied upon the under-layer, which may be chrome applied via galvanic treatments and may have a thickness of 0.05 micron (0.00005 mm). By way of example, chrome offers high hardness and low friction, providing a very high wear resistance. A decorative (e.g., satin, bright, etc.), functional (e.g., to provide additional hardness), or protective physical vapor deposition (PVD) top-layer may be specifically chosen to include different pigments and the like, which may be zirconium or titanium. This top-layer may be provided on the sub-micron level. In this manner, the conductive portion of the handles can be specifically designed to complement the fitness machine, rather than having a standard stainless-steel appearance.

A detailed further example is now provided for an electroplating metallization process for the surface of Acrylonitrile Butadiene Styrene (ABS) in a manner known in the art. An etching process is performed on the ABS material in which the butadiene is eluted from the ABS (e.g., via liquid chrome), forming an anchor holes on the surface of the ABS. Next is a reducing process in which the chrome is removed from the surface of the product. A first activation process follows, whereby a palladium and tin compound is absorbed into the anchor hole on the injected surface, then a second activation process in which tin is removed and the palladium is metallized. A chemical nickel process is then performed, whereby nickel and the palladium chemically react to form a nickel layer.

A copper sulphate plating process is next performed, providing a buffering action between the injection and the nickel plated later. A semi-gloss nickel plating process may be performed next, which prevents corrosion of the copper plated layer, followed by a gloss nickel plating process to add gloss to the chrome plated layer. A molybdenum nickel plating process is then performed to inhibit corrosion, followed by a chrome plating process for aesthetics and anti-wear properties.

In one example, the resultant product has layers as follows: 1) ABS resin material, 2) a chemically plated layer for adding conductivity (e.g., ~0.2-0.6 μm), 3) a copper layer for buffering between the metal and the ABS (e.g., ~10.0-20.0 μm), 4) a semi-gloss nickel layer for improving anti-corrosion (e.g., ~12-20 μm), 5) a gloss nickel layer for adding gloss and anti-corrosion (e.g., ~8-12 μm), 6) a molybdenum-nickel layer for resisting corrosion (e.g., ~0.8-1.2 μm), and 7) a chrome layer for resisting corrosion, resisting wear, and providing gloss (e.g., 0.25-0.5 μm).

Once assembled, the handle will have at least one area defined by the second material, which correspond to the conductive region or electrode needed for each hand of the user (shown throughout the present disclosure as two areas corresponding to two conduction regions or electrodes for each hand). The two conductive areas may be formed within a same part, or may be provided together as the result of coupling two parts together that each have one such area of the second material. The handle and its parts are configured such that when the handle is fully assembled and coupled to the fitness machine, the two or more areas comprising the second material are non-continuous (i.e., are non-touching so as to be electrically isolated from each other).

In this manner, once the parts have been completed and assembled together, each handle has a non-conductive portion where the first material from the first shot was not overlayed by the second material, and first and second conductive portions where the two non-contiguous areas were formed by the second material and subsequently overlaid with a layer of electroplating processing.

Figure 6:
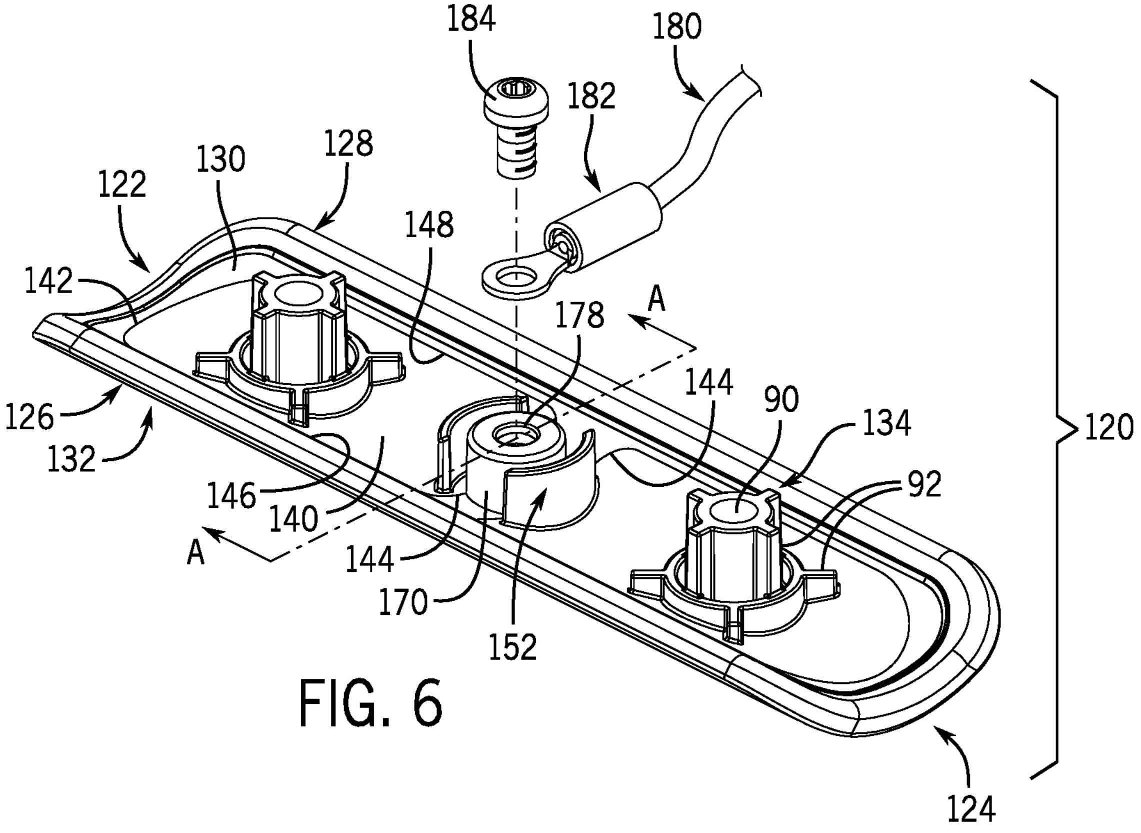
FIG. 6 is a perspective view showing one embodiment of one part of a handle according to the present disclosure.
Figure 7:
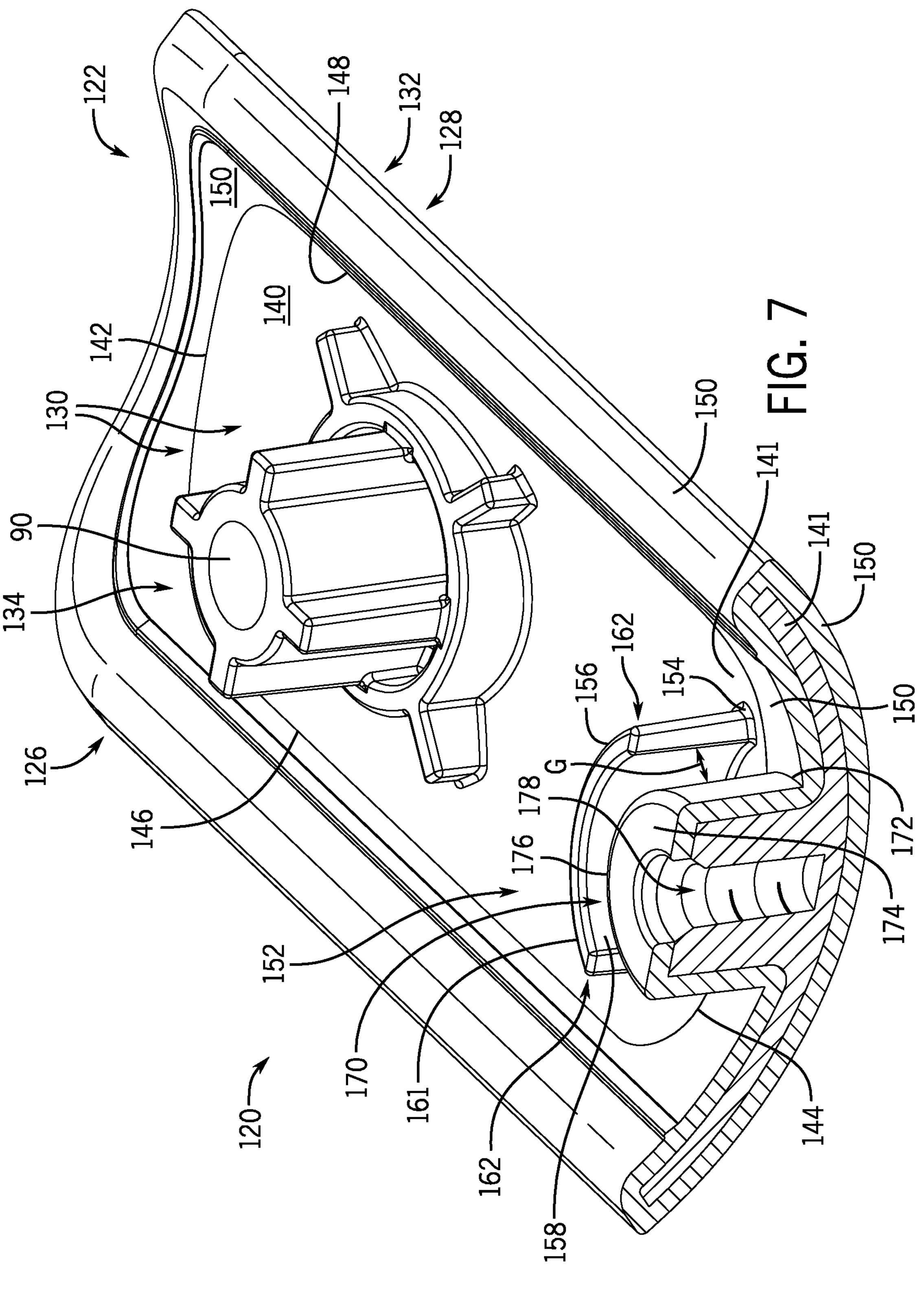
FIG. 7 is a sectional view taken along the line A-A in FIG. 6.

FIGS. 6 and 7 show a part 120 of a handle made in accordance with the present disclosure. The part 120 extends along a length between a first end 122 and a second end 124, along a width between a third end 126 and a fourth end 128, and has both an interior side 130 and an exterior side 132 that extend therebetween. A thickness is defined between the interior side 130 and the exterior side 132. The interior sides 130 of two parts 120 face inwardly towards each other when coupled together to form a handle, whereas the exterior sides 132 face away from each other. The length, width, thickness, and overall shape of the part 120 are variable and may be selected to be exactly the same as those for the part 3' of FIG. 4. This is also true of the dimensions of the standoffs 134 extending away from the interior side 130, despite being shown in FIG. 6 to have a shorter configuration. This flexibility provides that the part 120 may advantageously be retrofitted into existing fitness devices configured for the part 3'.

With continued reference to FIGS. 6 and 7, the part 120 includes a non-conductive portion 140 formed by the first material of the first shot, which as stated above is incompatible with electroplating and thus remains non-conductive. In contrast, the second material of the second shot (shown separately as the second material 141 in FIG. 7) is compatible with electroplating. The electroplating material that is formed as a layer upon the second material via electroplating processes is generally shown as the conductive portion 150. Though not shown in FIG. 7, the first material may also be present beneath the second material 141 (e.g., as a core upon which the second material 141 is injected). As shown in FIG. 7, the non-conductive portion 140 may be completely encapsulated by the conductive portion 150 on the exterior side 132 of the part 120.

In the embodiment of FIGS. 6 and 7, the interior side 130 of the part 120 the non-conductive portion 140 forms two separate areas. Each area forming the non-conductive portion 140 extends along a length between a first end 142 and a second end 144 and along a width between a third end 146 and a fourth end 148 that are each inward of the first end 122, the second end 124, the third end 126 and the fourth end 128 of the part 120 overall, respectively. The second ends 144 for each area of the non-conductive portion 140 end near a midpoint between the first end 122 and the second end 124 of the part 120.

Walls 152 extend perpendicularly upwardly (in the orientation shown in FIGS. 6 and 7) from the non-conductive portion 140 at the second end 144 thereof. The wall 152 has a base 154 and a top 156 that define a height therebetween. The wall 152 further has an inside surface 158 and an outside surface 161 defining a thickness therebetween, and also ends 162 that define a width therebetween. The wall 152 has a nearly semi-circularly contour therebetween the ends 162 such that the inside surface 158 is concave and the outside surface 161 is convex.

The walls 152 of the two non-conductive portions 140 together partially surround, and thereby protect, a boss 170 that extends perpendicularly upwardly (in the orientation shown in FIGS. 6 and 7) from the conductive portion 150 near the midpoint between the first end 122 and the second end 124 of the part 120. The boss 170 has a base 172 and a top 174 that define a height therebetween, which in this example is shorter than the heights of the walls 152. The boss 170 has an outside surface 176 and an opening 178 extending downwardly from the top 174, a thickness being defined between the outside surface 176 and the threaded opening 178. The opening 178 may be threaded, or a self-tapping fastener may be used. The outside surface 176 is shown to form a circular shape such that the entire boss 170 is substantially cylindrical. As shown in FIG. 7, the top 174 and outside surface 176 of the boss 170 is comprised of the conductive portion 150, whereas an interior or core of the boss 170 is comprised of the second material 141 upon which the conductive portion 150 is layered.

With reference to FIG. 6, since the conductive portion 150 wraps around the part 120, the boss 170 on the interior side 130 is electrically connected to the exterior side 132 that is contacted by the operator in use. The boss 170 is configured such that a conductor 180, here a wire with a ring terminal 182, can be coupled to the conductive portion 150 to provide an electrical connection to a control system within the fitness machine, as discussed below. In particular, a fastener 184 such as a screw or bolt extends through the ring terminal 182 at the end of the conductor 180 and threads into the threaded opening 178 in the boss 170. In this manner, engaging the fastener 184 draws the conductor 180 into contact with the top 156 of the boss 170 to electrically connect the conductor 180 and the conductive portion 150.

As stated above, the walls 152 of the non-conductive portion 140 protect the conductor 180 coupled to the boss 170 from damage during installation. Moreover, a gap G is provided between the walls 152 and the boss 170 to provide further buffer in the event that the walls 152 are bumped. The walls 152 also help prevent the unintentional shorting between the conductor 180 and the arm or other structure on which the handle is mounted.

The present inventor has identified that this design for electrically coupling the conductor 180 to the conductive portions 150 of the handle is particularly advantageous over those presently known in the art. First, using a ring terminal 182 is more secure and permits a better electrical connection than an interference connection as known, which can be inadvertently disconnected during assembly or use. Additionally, because the fastener 184 draws the conductor 180 flush into contact with the top 156 of the boss 170, there is no abrasion or wear of the electroplating material comprising the conductive portion 150. The present inventor has recognized that electroplating could not be used with the spade-type connectors used in handles today, as the act of connecting and disconnecting the conductor would scape off the relatively thin layer and destroy its functionality. Today's handles rely on a relatively thick steel plate to not only be resistant to wear from connecting and disconnecting, but also to bending and snapping, as discussed above. In contrast, the present design allows the strength to be provided by the width and thickness of the second material 141 inside the boss 170, rather than requiring this strength of the conductive portion itself (e.g., the electroplating material).

Figure 8:
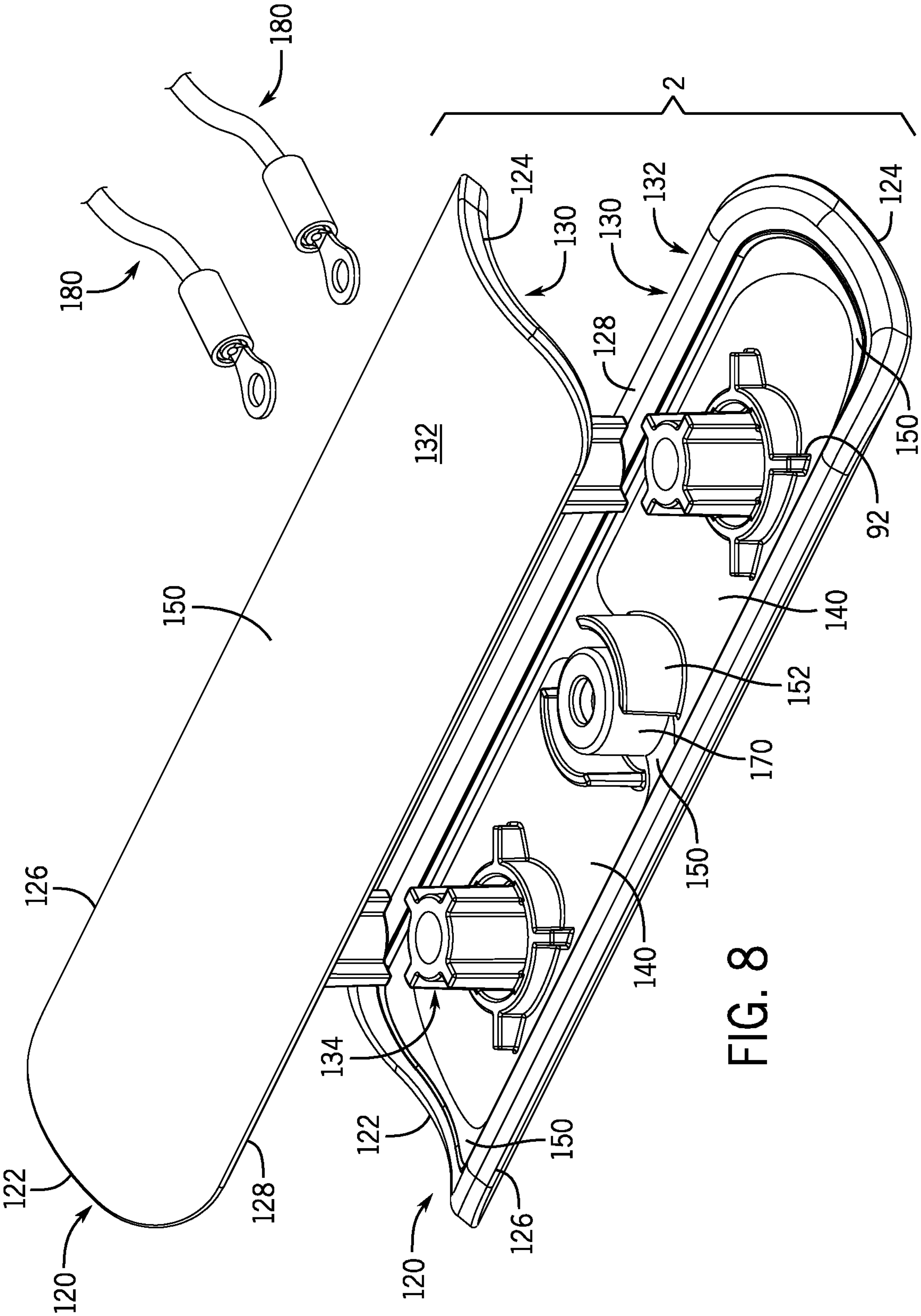
FIG. 8 is a perspective view showing two parts combinable to form a handle according to the present disclosure.
Figure 12:
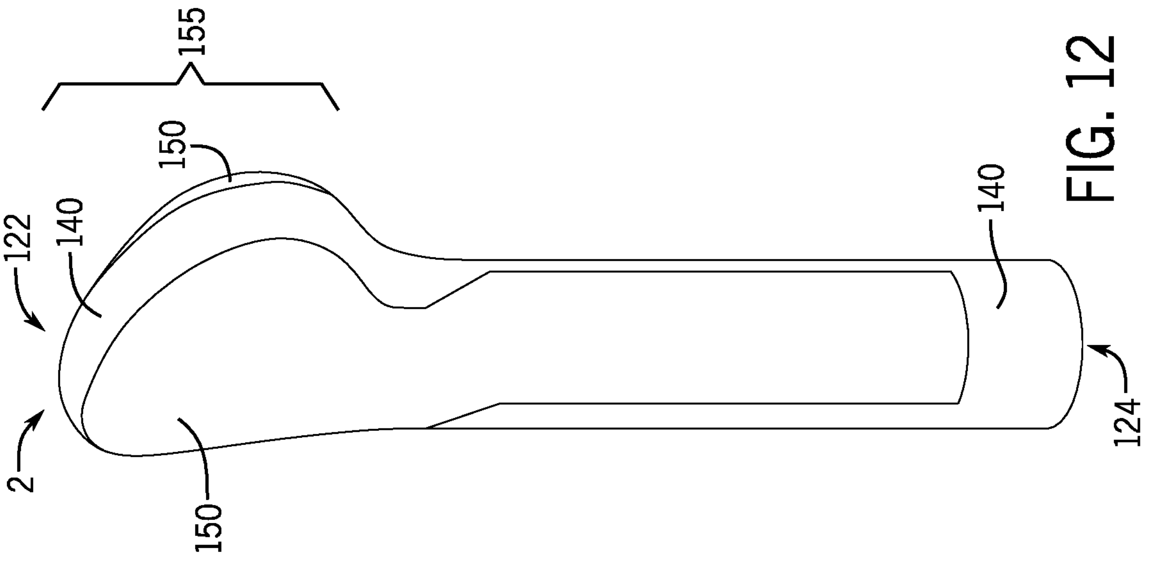
FIG. 12 is a perspective view showing another embodiment of a complete handle according to the present disclosure.

With reference to FIG. 8, it should be recognized that a complete handle 2 typically includes two conductive portions 150 within non-contiguous areas of the handle 2 (though a handle with one conductive portion 150 is also contemplated, as discussed above). The two conductive portions 150 may be formed on separate parts 120 of the handle, or the same part of the handle. A separate conductor 180 is coupled to each of the separate conductive portions 150 so as to be separately connected to the control system in a manner known in the art. The parts 120 of a given handle 2 may be identical to each other, may vary in structure (e.g., different standoffs 134), may vary in overall shape (e.g., between the first end 122 and the second end 124 and/or between the third end 126 and the fourth end 128), or may vary in the shape, size, and/or placement of the conductive portion 150 relative to the non-conductive portion 140. This allows handles 2 to be designed in a manner most comfortable for the operator, rather than being constrained by the cost, complication, and tolerancing of a handle requiring stainless steel plates for the conductive portions. By way of example, the present inventor has recognized that egg-shaped portions of handles 2 are often particularly ergonomic for the operator, such as for a cross-trainer or elliptical trainer. However, it would be very challenging and expensive to fabricate complex shapes (such as the egg shape 155 of FIG. 12) using steel plates for the conductive portions 150.

Figure 9:
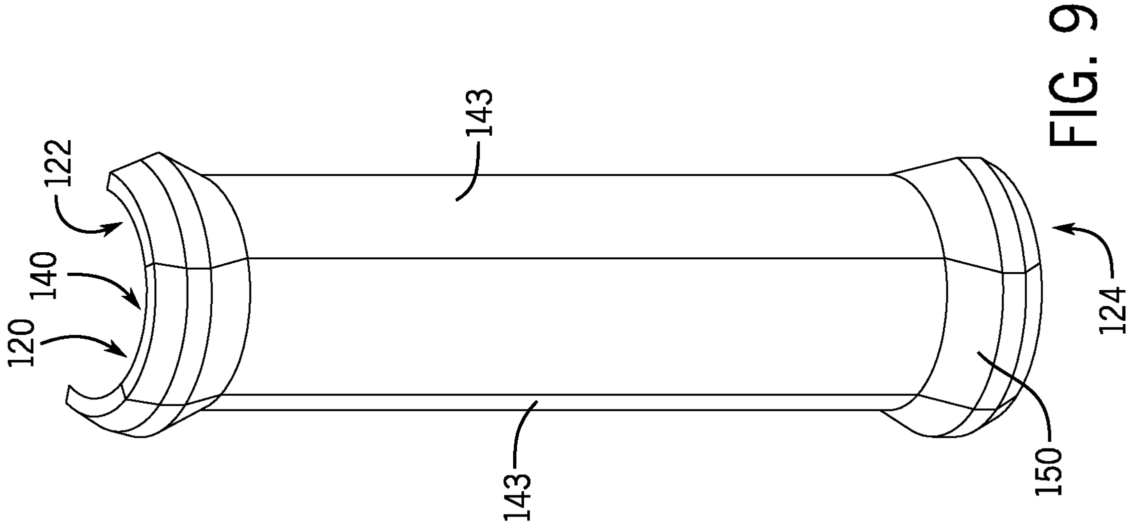
FIG. 9 is a perspective view showing another embodiment of a part for a handle according to the present disclosure.

The parts 120 of FIG. 8 may be coupled directly to an arm that is non-conductive (i.e., the arm needing to act as an insulator since the conductive portions 150 of the parts 120 wrap around the edges thereof. The arms may have recesses corresponding to the shapes of the parts 120 such that the conductive portion 150 can be recessed therein, for example such that the exterior side 132 is flush with the arm. In alternative embodiments, the parts 120 may contact each other when coupled to the arm (e.g., together encircling the arm), provided that the conductive portions 150 are positioned to not be in contact with each other. The parts 120 of FIG. 8 may alternatively be combined with additional non-conductive shells 143 (see FIG. 9) that are adjacent to any conductive portions 150 to provide electrical isolation between the conductive portions 150 when assembled together as a full handle.

The embodiment of FIG. 8 further shows a configuration in which each of the parts 120 is configured to be coupled to the arm 28 (see FIG. 1) of the fitness machine by press-fit with the standoffs 134 and/or adhesives. This is in contrast to other examples as discussed above, whereby fasteners extend through the parts and into the arm or an opposing part 120.

Figure 10:
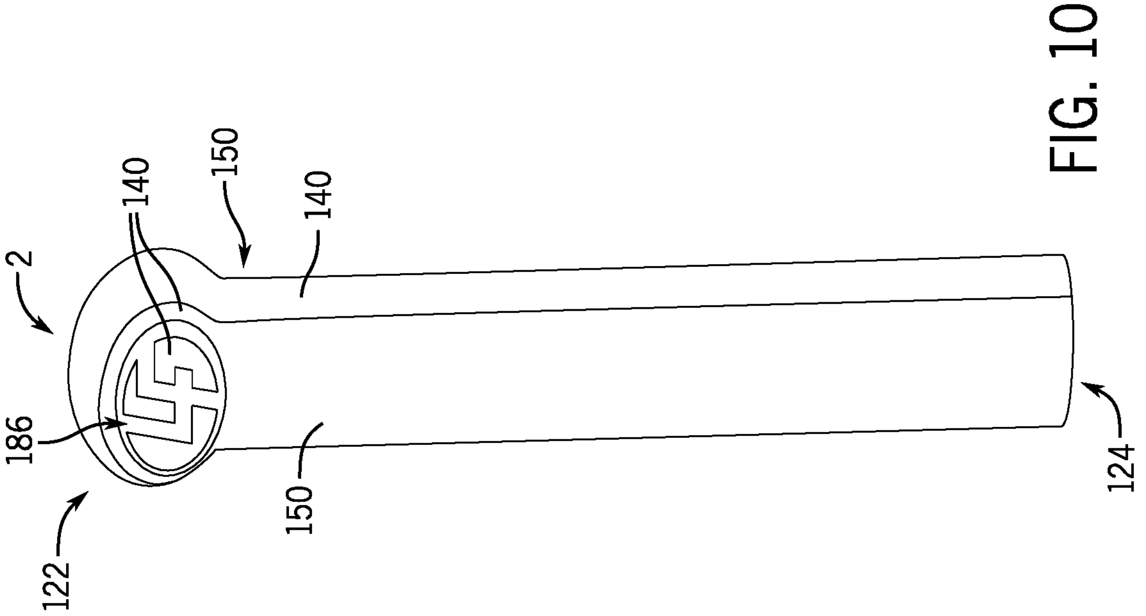
FIG. 10 is a perspective view showing another embodiment of a complete handle according to the present disclosure.

FIGS. 9-12 show additional designs of handles 2 that while challenging or impossible to produce using conventional methods can be made with ease according to the present disclosure. Specifically, these complicated designs are made possible by the presently disclosed processes of providing the conductive portions 150 of the handles 2 as a layer in two noncontinuous areas, rather than using thick steel plates. For example, the contoured shapes of the conductive portion 150 of FIGS. 9, 10, and 12 would be costly and challenging to fabricate. Similarly, FIG. 10 shows a design in which an island 186 of non-conductive portion 140 is surrounded by the conductive portion 150, which allows a logo of different color, sheen, finish, texture, or material to stand out for branding and the like. The cutout for the island 186 under conventional methods would be costly, create tolerancing challenges, and create significant risks of ingress, salt-bridging (discussed below), and uneven or sharp edges.

Additionally, since conductive portions 150 of handles 2 according to the present disclosure are provided directly on the same part 120 as the non-conductive portion 140, there are no concerns for tolerancing, thereby not necessitating that gaps be left between these portions. For handles presently known in the art, the gap between the conductive portions and the non-conductive portions must be sufficient to allow the non-conductive portion to expand or contract around the conductive portion during production so as to not create internal stress and strain. A sufficient gap is also needed to provide space for grasping mechanisms that grab the conductive portion 150 on either side during installation on the non-conductive portion 140.

These gaps, which may be up to 1.0 mm, allow dirt and debris to build up in conventional fitness machines known in the art, and also provide for ingress of water and sweat that can damage the handle and components thereof. This also leads to an effect known as "salt bridging", whereby salt from user perspiration builds up in the gap and within the handle, forming a conductivity pathway to the metal frame within the fitness machine. This electrical shorting destroys the functionality of the conductive portions 150 in measuring electrical activity for the user and may also lead to permanent damage of the electrical components. Devices presently known in the art seek to minimize this ingress and salt bridging via complicated and costly lips and gaskets between the parts of the handles (see gasket 5 in FIG. 4), which seek to direct the moisture away from the inside of the handles.

By forming the conductive portion as a layer upon the injection molded article via electroplating in the manner presently disclosed, the need for such gaskets and other features designed to keep this gap between conductive and non-conductive portions clean is completely eliminated. This saves time and cost in assembly. Moreover, the design features of devices presently known in the art are still subject to failure over time, a problem that is avoided entirely by the presently disclosed design.

The part 120 may also advantageously be designed such that the conductive portion 150 is recessed or perfectly flush with the non-conductive portion 140, providing improved customer experience and overall aesthetic. In particular, the second material may be injected to as to be recessed relative to the first material, and specifically with a difference in height equal to that which will later be formed as the electroplated material on top of the second material. This provides that when the part 120 is completed, the conductive portion 150 is the exact same height as the non-conductive portion 140.

Figure 11:
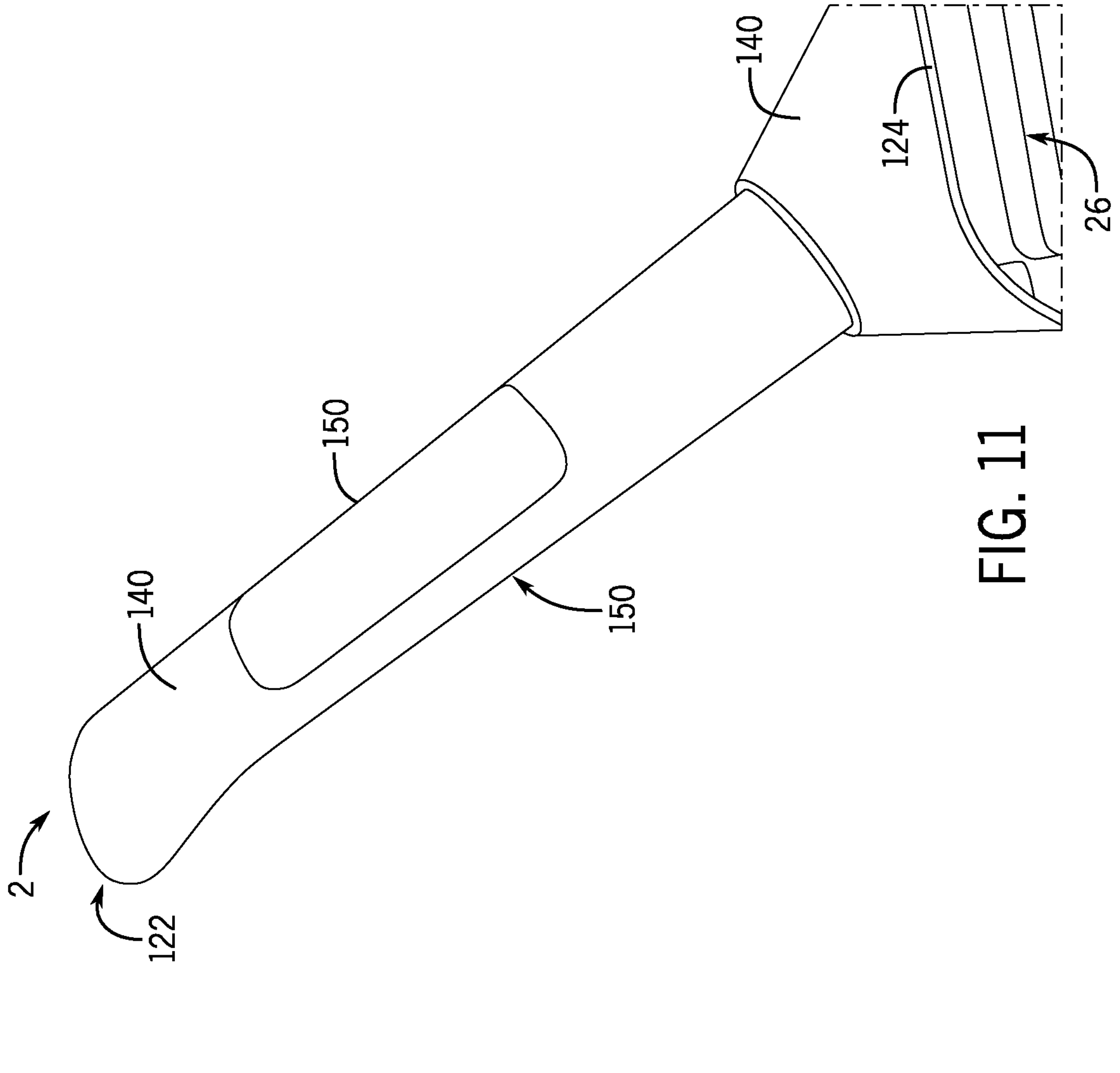
FIG. 11 is a perspective view showing another embodiment of a complete handle according to the present disclosure.

Additionally, the presently disclosed handles and making methods for handles can further be used to eliminate the need for the shell parts (see shell 143 in FIG. 9) and/or separate arms 28 (see FIG. 1) for connecting the handles 2 to the fitness machine 1. FIG. 11 shows a handle 2 in which the non-conductive portion 140 includes both part of the handle 2, and also the arm 28 to be coupled to the horizontal member 26 (see FIG. 1) of a fitness machine 1. This provides electrical isolation between the two conductive portions 150 of the handle 2 while also positioning the handle 2 in the correct position for use. The present inventor has recognized that this combination further eliminates inventory, cost, and time and complication for assembly and/or replacement. This also reduces further tolerancing issues as there is no longer a need to accommodate for spacing between the conducting and non-conducting portions of the electrode, spacing between the non-conducting portions of the electrode and non-conducting shells, and spacing between the non-conducting shells the arm.

Certain aspects of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

Figure 13:
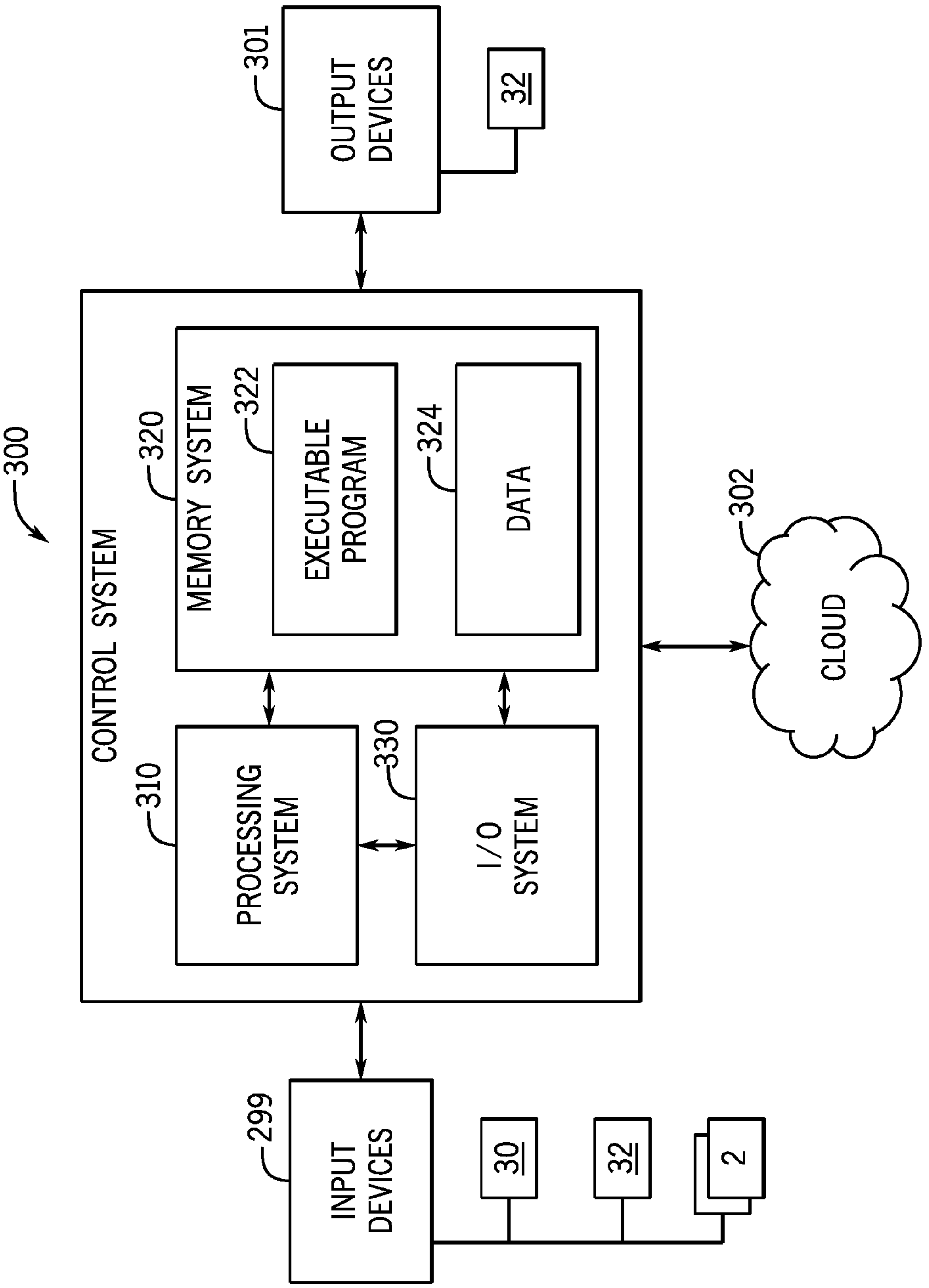
FIG. 13 depicts an exemplary control system for measuring electrical activity via the handles according to the present disclosure.

With reference to FIG. 13, the control system 300 communicates with each of the one or more components of the fitness machine 1 (e.g., handles 2) via conductors 180 and other communication links CL, which can be any wired or wireless link. The control system 300 is capable of receiving information and/or controlling one or more operational characteristics of the fitness machine 1 and its various sub-systems by sending and receiving control signals via the communication links CL (e.g., via commands from the console 32, controls 30, and handles 2). Moreover, the communication link CL lines are meant only to demonstrate that the various control elements are capable of communicating with one another, and do not represent actual wiring connections between the various elements, nor do they represent the only paths of communication between the elements. Additionally, the fitness machine 1 may incorporate various types of communication devices and systems, and thus the illustrated communication links CL may in fact represent various different types of wireless and/or wired data communication systems.

The control system 300 may be a computing system that includes a processing system 310, memory system 320, and input/output (I/O) system 330 for communicating with other devices, such as input devices 299 and output devices 301, either of which may also or alternatively be stored in a cloud 302. The processing system 310 loads and executes an executable program 322 from the memory system 320, accesses data 324 stored within the memory system 320, and directs the fitness machine 1 to operate as described in further detail below.

The processing system 310 may be implemented as a single microprocessor or other circuitry, or be distributed across multiple processing devices or sub-systems that cooperate to execute the executable program 322 from the memory system 320. Non-limiting examples of the processing system include general purpose central processing units, application specific processors, and logic devices.

The memory system 320 may comprise any storage media readable by the processing system 310 and capable of storing the executable program 322 and/or data 324. The memory system 320 may be implemented as a single storage device, or be distributed across multiple storage devices or sub-systems that cooperate to store computer readable instructions, data structures, program modules, or other data. The memory system 220 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

In this manner, the present disclosure improves upon the process for making handles for fitness devices, enabling more geometrically complicated designs. As discussed above, this provides improved comfort for the user, provides aesthetically pleasing designs, and results in a longer-lasting product, all while decreasing the cost and inventory burden of production.

It should be recognized that while the present disclosure discussed a process in which the second material is subsequently layered with electroplating material, alternative processes in which the second material is itself conductive are also contemplated.

Figure 14:
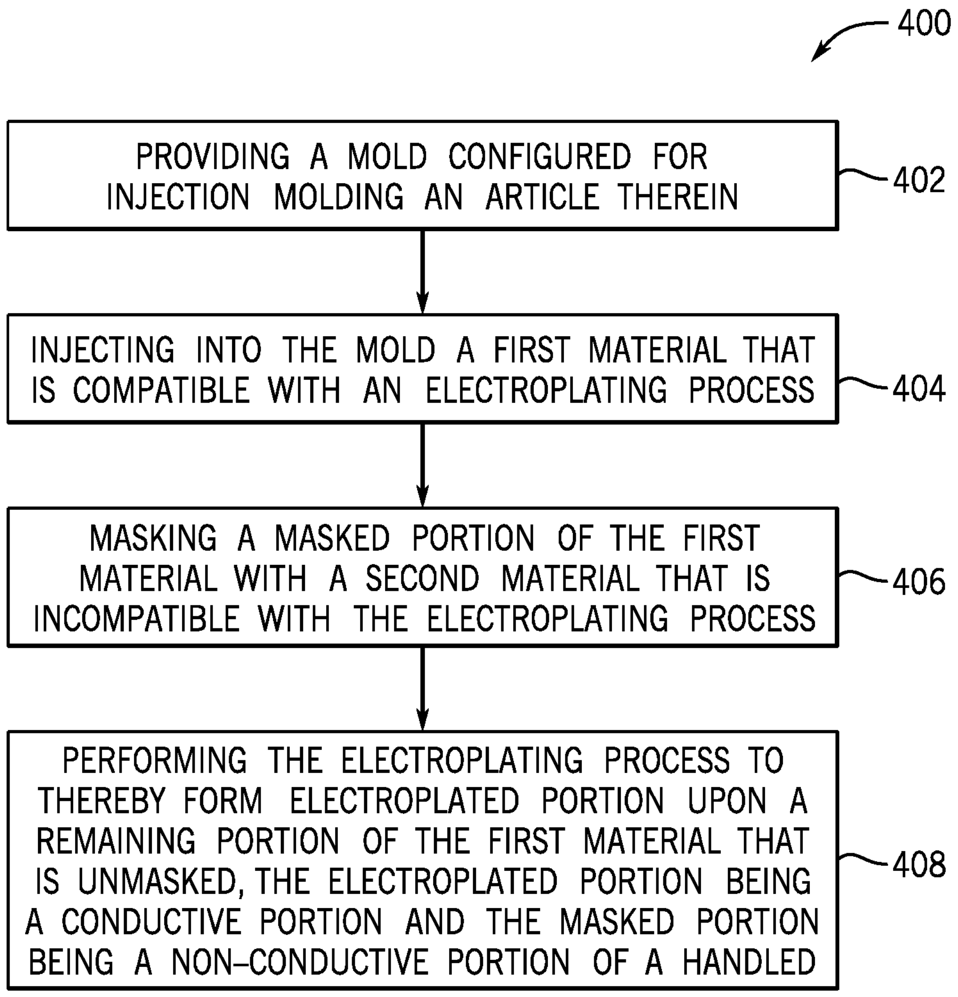
FIG. 14 is a flow chart of another method for making a handle according to the present disclosure.

Further, the present disclosure contemplates configurations in which the first material is compatible with the electroplating process and a second material is applied as a mask in a masked portion of the first material, whereby the second material is incompatible with the electroplating process. FIG. 14 shows an example method 400 for producing a handle according to the present disclosure using masking techniques. In step 402 a mold configured for injection molding an article therein is provided, which is injected with a first material that is compatible with an electroplating process in step 404. By way of example, the first material may be ABS plastic and the mold may be filled in a single, one-shot process.

A portion of the first material is then masked with a second material (this portion also being the masked portion) that is incompatible with the electroplating process in step 406. The second material may provide chemical and/or physical masking of the first material such that the masked portion is not or is no longer compatible with the electroplating process, in contrast to the remaining portion of the first material that is unmasked by the second material. By way of example, the masked portion may be covered by caps and/or plugs comprising cured silicone material and EPDM rubber, plating tape comprising polyester, lead toil, or other materials (e.g., Electroplating Tape model 470/470L or Lead Foil Tape model 421/420 produced by 3M @), or others known in the art. The mask may alternatively be provided by dipping the part in the second material, spraying or brushing on the second material, or otherwise processing or treating the first material in a manner known in the art. By way of example, Red Spot Paint & Varnish Co., Inc. of Evansville, Indiana produces a lacquere that may be used as the second material, part number ARC-29718 ("Black Resist Lacquer").

Once the masking is complete, step 408 provides for performing the electroplating process on the part to thereby form an electroplated portion of electroplating upon a remaining portion of the first material that is unmasked (by virtue of being compatible with the electroplating processes). The masked portion remains free of electroplating by virtue of being incompatible with the electroplating process. Since the electroplating is conductive, the electroplated portion is therefore a conductive portion of the completed handle and the masked portion is a non-conductive portion of the handle.

Figure 15:
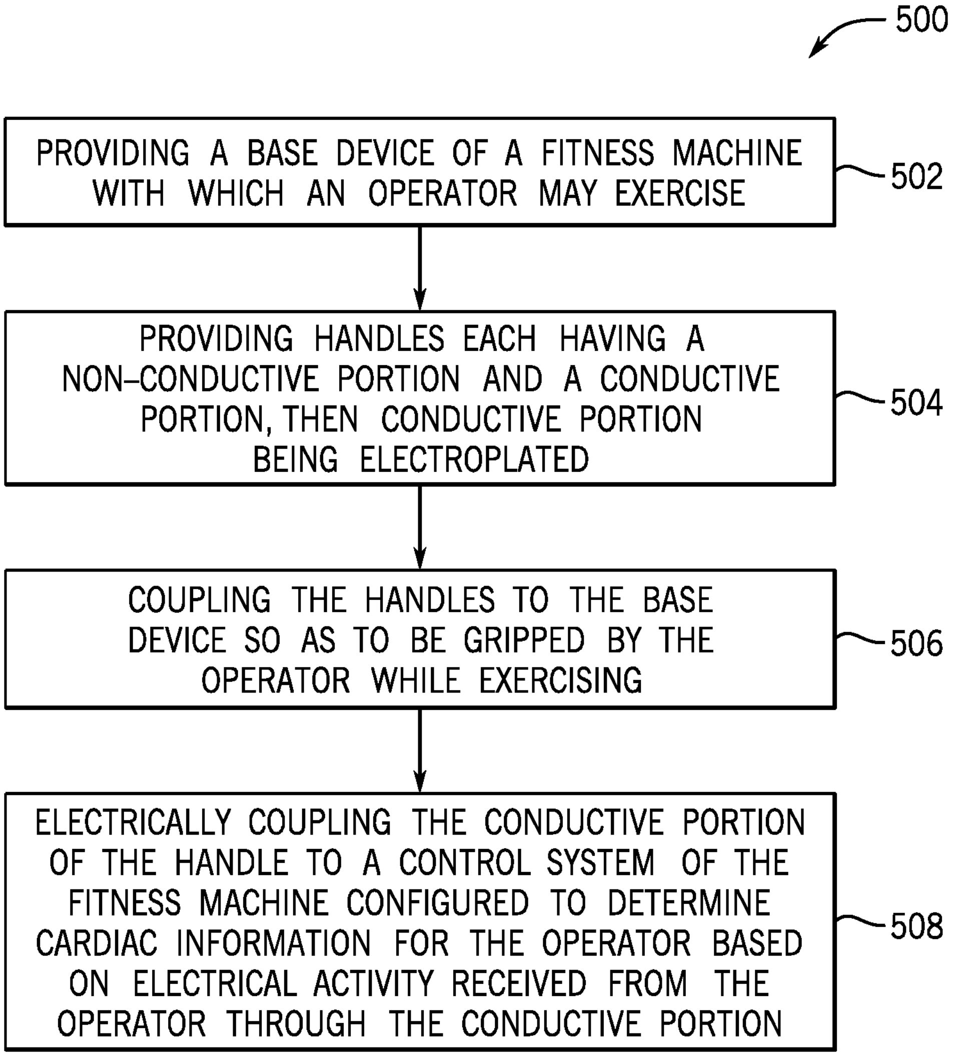
FIG. 15 is a flow chart of a method for making a fitness machine according to the present disclosure.

FIG. 15 illustrates another example of a method 500 for making a fitness machine according to the present disclosure, such as with the handle produced via the method 400 of FIG. 14. In step 502, a base device of a fitness machine with which an operator may exercise is provided, which may be the same or similar to that described above. By way of example, the base device may be a treadmill with arms configured for coupling handles thereto. The treadmill also may have a control system configured to determine cardiac information for the operator while exercising upon receiving electrical signals from the handles.

Handles are provided in step 504, whereby the handles each have a non-conductive portion and a conductive portion, whereby the conductive portion is electroplated. Step 506 provides for coupling the handles to the base device in a manner described above, described further below, or others known in the art. The handles are coupled to the base device such that they may be gripped by the operator while exercising (e.g., coupled to arms of a treadmill, an elliptical trainer, or an exercise bicycle).

Step 508 provides for electrically coupling the conductive portions of the handles to a control system such as that described above. The control system is configured to determine cardiac information for the operator based on electrical activity that is received from the operator through the conductive portion. Once the electrical signals are received by the control system, the determination of the cardiac information therefrom may be performed in a manner well known in the art.

Figure 16:
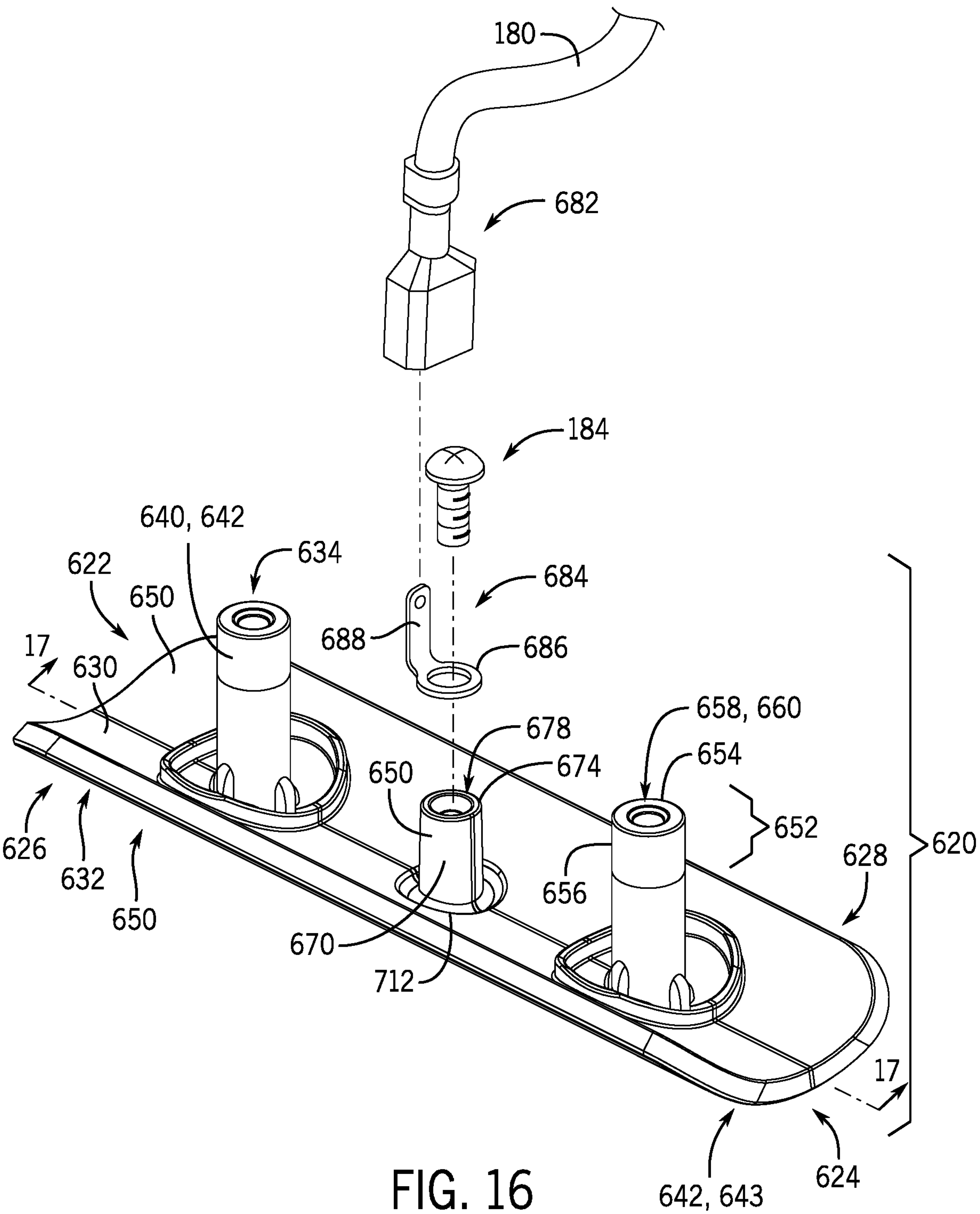
FIG. 16 is a perspective view showing another embodiment of one part of a handle according to the present disclosure.
Figure 17:
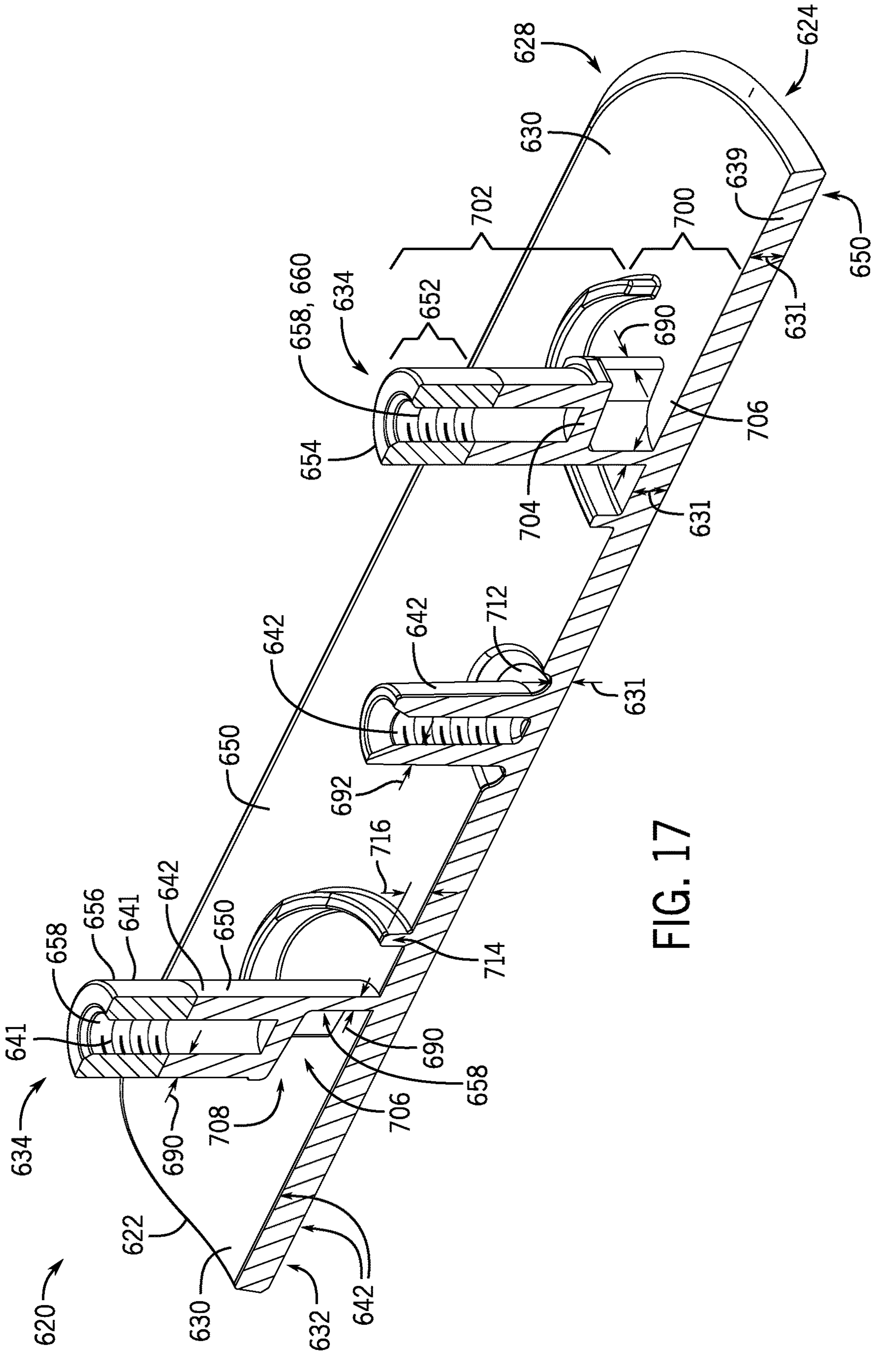
FIG. 17 is perspective sectional view of another embodiment of one part of a handle according to the present disclosure.

Additional information is now provided for further embodiments of handles according to the present disclosure. FIGS. 16 and 17 show a part 620 of another handle made in accordance with the present disclosure. The part 620 extends along a length between a first end 622 and a second end 624, along a width between a third end 626 and a fourth end 628, and has both an interior side 630 and an exterior side 632 that extend therebetween. A thickness is defined between the interior side 630 and the exterior side 632. The interior sides 630 of two parts 620 face inwardly towards each other when coupled together to form a handle, whereas the exterior sides 632 face away from each other. The length, width, thickness, and overall shape of the part 620 are variable and may be selected to be exactly the same as those for the part 3' of FIG. 4. This is also true of the dimensions of the standoffs 634 extending away from the interior side 630. This flexibility provides that the part 620 may advantageously be retrofitted into existing fitness devices configured for the part 3' described above. It should be recognized that the parts 620 of FIGS. 16 and 17 may include features that while not shown for the parts 120 of FIGS. 6 and 7 could be incorporated therewith, and vice versa. As such, the present disclosure contemplates different combinations of these features than those shown in a single drawing.

In contrast to the parts 120 shown in FIGS. 6 and 7, the part 620 may be formed via single shot injection molding along with a masking process such as shown in FIG. 14 and described above. The molding process produces a part made of a first material 639 that is compatible with an electroplating process, such as ABS-PC. A portion of the first material 639 is masked before performing the electroplating process, such as with polyester tape. This is also referred to as the masked portion 641 of the first material 639 or of the part 620 more generally. For simplicity, the same name of the masked portion 641 may be used even if masking material has been removed. After the electroplating process is completed as described above or in a conventional manner, electroplating 642 is formed on a remaining portion of the first material 639 that is unmasked by the mask (also referred to as the electroplated portion 643 of the first material 639 or of the part 620 more generally). In other words, the part 620 may be covered in electroplating 642 except within the masked portion 641.

The masked portion 641 then serves as the non-conductive portion 640 of the part and the electroplated portion 643 then serves as the conductive portion 650 of the part. The conductive portion 650 is then usable to receive electrical activity from an operator in the manner described above. It should be recognized that the masking material may be left in place, or removed after the electroplating process is completed. For example, if the first material is non-conductive, the masking material may be removed.

In the example shown in FIGS. 16 and 17, the masked portion includes an upper portion 652 of the standoffs 634 for coupling the parts 620 to the fitness machine, including a top 654, an outer surface 656, and an inner surface 658 comprising the opening 660 for coupling the handle to the fitness machine via fasteners in a conventional manner. In certain embodiments, the masked portion is masked via a cap placed over the top of the standoffs 634 such that the threads in the inner surface 658, the top 654, and the outer surface 656 are all covered during the electroplating process, after which the cap may be removed to reveal a masked portion that is substantially free of electroplating.

Since the upper portion 652 of the part 620 is substantially free of electroplating, it is non-conductive and thus permits the part 620 to be coupled to the fitness machine and to another part without creating an electrical pathway to the part 620. In other words, the upper portion 652 electrically isolates the part 620 from the rest of the fitness machine, even where the remainder of the part 620 is covered in electroplating. It should be recognized that in other embodiments, the masking (e.g., a cap on the standoff 634 that includes the opening 660 therein) may be left in place, particularly where the underlying first material 639 is at conductive, to provide this electrical isolation for the part.

The conductive portion 650 also includes boss 670 for electrically coupling the conductive portion of the part 620 to a control system, similar to that described above for the boss 170 of FIGS. 6 and 7). The configuration of FIGS. 6 and 7 provided for connecting a conductor 180 (e.g., a wire) to the part 120 by extending a fastener 184 through a ring terminal 182 of the conductor 180 and into boss 170. The same fastening technique may also be used for the part 620 of FIGS. 16 and 17 (threading the fastener 184 into a threaded opening 678 in the top 674 of the boss 670). The present inventor has identified that the part 620 may alternatively be electrically coupled to a conductor 180 in another manner, including for conductors having other types of connections than ring terminals (e.g., a spade-type connector 682 as used in some existing fitness machines). In this case, a ring-spade connector 684 having both a ring terminal 686 and a spade 688 that extends perpendicularly from one end of the ring terminal 686. The ring-spade connector 684 is electrically coupled to the conductive portion 650 of the part 620 via compression by inserting the fastener 184 through the ring terminal 686 and into threaded engagement within the opening 660 in the boss 670. The spade-type connector 682 of the conductor 180 may still be used to electrically couple the conductor 180 to the conductive portion 650 of the part 620, specifically by mating with the spade 688. As discussed above, this prevents damage to the electroplating 642 by avoiding the scraping action of a spade-type connector, but still permits use of a spade-type connector. As also discussed above, this is particularly advantageous as many existing fitness machines have conductors with spade-type connectors. Moreover, the part 620 as shown in FIGS. 16 and 17 advantageously provide that if the spade 688 is ever damaged, the ring-spade connector 684 can simply be replaced rather than replacing the entirety of the part 620 or handle.

Through experimentation and development, the present inventor has recognized further challenges that may arise in certain embodiments of handles produced via electroplating processes. In particular, since the electroplating 642 may be very thin, any contours on the surface of the underlying part comprising the first material 639 are visible as like-contours on the surface of the electroplating 642 (which for the exterior side 632 of the part 620 is visible to the operator). In this manner, any deformations, distortions, warping, and/or the like from producing or processing the first material 639 may detract from the aesthetics and create an unpleasant feeling for the operator when gripped in use. The problem may be further exacerbated by the selected color, texture, and finish of the electroplating 642 (discussed above), whereby glossy finishes may make any defects even more visually apparent.

In view of this, the present inventor has designed certain embodiments of the part 620 as disclosed herein to prevent surface variations sometimes caused by injection molding the part 620 of the first material 639, such as shown in FIGS. 16 and 17. In particular, the present inventor has recognized that thicker areas of the first material 639 cool at different rates than thinner areas, creating distortions. This additional thickness 631 (e.g., between the interior side 630 and the exterior side 632) necessarily occurs where the standoffs 634 and the boss 670 extend upwardly from the inner side 630 of the part 620. However, the thicknesses 690, 692 of the walls 694, 696 forming the standoffs 634 and the boss 670 (i.e., between the outer surface 656 and the inner surface 658 and between the outer surface 698 and the inner surface having the threaded opening 678, respectively) also defines how cooling and thermal expansion occur where the standoffs 634 and the boss 670 meet the inner side 630 of the part 620.

The present inventor has recognized that one mechanism for preventing defects while producing the part 620 is by debossing the first material 639. FIG. 16 shows one such example of debossing via an annular cutout 712 at the base of the boss 670, which provides that there are no excessively thick sections which would create “shrink” in the final part.

Another mechanism for preventing defects while producing the part 620 is shown for the example of FIG. 17. The part 620 is configured such that the standoffs 634 have a lower section 700 and an upper section 702 (the upper section 702 including the masked portion 652 discussed above) that are separated via a floor 704 that at least partially closes off the opening 660. Below this floor 704, or within the lower section 700, the thickness 690 of the standoffs 634 is reduced as compared to in the upper section 702. This design provides for less material for cooling near the inner side 630 of the part 620, while still having enough thickness to be structurally sound in the upper section 702 for coupling the part 620 to another part and to the fitness machine.

Further benefit is provided by having an opening 708 in one portion of the outer surface 656 of each standoff 634, which with the floor 704 above is sometimes referred to in the industry as a doghouse 706. The opening 708 of the doghouse 706 allows for cooling within the lower section 702 and a flow path for the first material 639 along the inner side 630 thereof.

Benefits may also or alternatively be provided by providing a reduced thickness 631 between the inner side 630 and the outer side 632 is proximity of areas that are thicker (i.e., where the standoffs 634 and the boss 670 are positioned). As shown in FIGS. 16 and 17, annular cutout 712 are provided surrounding the boss 670 to reduce issues with shrink, as discussed above. In particular, the annular cutout 712 has a reduced thickness 631 relative to that of the first material 639. In certain embodiments, shown here for the standoffs 634, a lip 714 extends upwardly from the inner side 630 of the first part 620 to into a corresponding hole in the handle plastics to precisely locate the parts relative to each other. This lip 714 extends upwardly by a height 716.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method of making a fitness machine, the method comprising:

providing a base device with which an operator may exercise;

providing handles each having a non-conductive portion and a conductive portion, the conductive portion being electroplated, wherein for at least one of the handles the conductive portion comprises a first conductive portion and a second conductive portion formed in two non-contiguous areas;

coupling the handles to the base device so as to be gripped by the operator while exercising; and electrically coupling the conductive portion of each of the handles to a control system configured to determine cardiac information for the operator, wherein the conductive portion of each of the handles receives electrical activity from the operator when gripped, and wherein the conductive portion is electrically coupled such that the electrical activity is provided to the control system for determining the cardiac information for the operator based thereon.

2. The method according to claim 1, further comprising forming each of the handles via two-shot injection molding, wherein a first shot in the two-shot injection molding comprises a first material that forms the non-conductive portion, and wherein a second shot in the two-shot injection molding comprises a second material that defines a shape of the conductive portion, whereby the conductive portion is electroplated upon the second material.

3. The method according to claim 2, wherein the first material is incompatible with an electroplating process and the second material is compatible with the electroplating process, further comprising performing the electroplating process on each handle to form the conductive portion upon the second material thereof.

4. The method according to claim 1, wherein the at least one of the handles comprises first part and a second part each having the non-conductive portion, and wherein a first area of the two non-contiguous areas is formed on the first part and a second area of the two non-contiguous areas is formed on the second part, further comprising coupling the first part and the second part together such that the non-conductive portions electrically insulate the first conductive portion and the second conductive portion from each other.

5. The method according to claim 4, further comprising forming the non-conductive portions of the first part and the second part of the at least one of the handles via two-shot injection molding, wherein a first shot and a second shot in the two-shot injection molding comprise a first material and a second material that are different than each other, wherein the non-conductive portions of the at least one of the handles have exterior sides facing outwardly and interior sides facing inwardly when the first part and the second part are coupled together, and wherein for the first part and the second part of the at least one of the handles the exterior side of the first material is entirely covered by the second material.

6. The method according to claim 1, wherein foreach of the handles each of the two non-contiguous areas extends between an exterior side configured to be contacted by the operator in use and an interior side positioned inside the at least one of the handles, further comprising, electrically coupling the control system via conductors to the interior sides of the two non-contiguous areas such that the conductors are protected within the handles.

7. The method according to claim 6, wherein the conductors comprise connectors for connecting wires, further comprising electrically coupling the control system to the two non-contiguous areas by drawing the connectors into contact with the interior sides of the two non-contiguous areas via fasteners.

8. The method according to claim 1, further comprising forming each of the handles of a first material via injection molding, wherein the first material is compatible with an electroplating process, further comprising masking the first material such that a masked portion of the first material is covered for each of the handles, and performing the electroplating process on each of the handles to form the conductive portion upon a remaining portion of the first material that is unmasked, wherein the masked portion forms the non-conductive portion of the handle.

9. The method according to claim 1, further comprising coupling the handles so as to be at least partially recessed within the base device.

10. The method according to claim 9, wherein each of the handles comprises an exterior surface configured to be contacted by the operator in use, further comprising coupling each of the handles to the base device such that the exterior surface is flush with the base device.

11. The method according to claim 1, further comprising, for each of the handles, forming the conductive portion to be less than 0.10 mm thick.

* * * * *